US010828723B2

(12) United States Patent
Mamrak et al.

(10) Patent No.: US 10,828,723 B2
(45) Date of Patent: Nov. 10, 2020

(54) PROCESS MONITORING FOR MOBILE LARGE SCALE ADDITIVE MANUFACTURING USING FOIL-BASED BUILD MATERIALS

(71) Applicant: GENERAL ELECTRIC COMPANY, Schenectady, NY (US)

(72) Inventors: Justin Mamrak, Loveland, OH (US); MacKenzie Ryan Redding, Cincinnati, OH (US); Thomas Graham Spears, Springdale, OH (US)

(73) Assignee: General Electric Company, Schenectady, NY (US)

( * ) Notice: Subject to any disclaimer, the term of this patent is extended or adjusted under 35 U.S.C. 154(b) by 259 days.

(21) Appl. No.: 15/811,313

(22) Filed: Nov. 13, 2017

(65) Prior Publication Data

US 2019/0143451 A1    May 16, 2019

(51) Int. Cl.
*B23K 26/342*    (2014.01)
*B23K 26/03*    (2006.01)
(Continued)

(52) U.S. Cl.
CPC ........ *B23K 26/342* (2015.10); *B23K 15/0086* (2013.01); *B23K 15/08* (2013.01); *B23K 26/03* (2013.01); *B23K 26/032* (2013.01); *B23K 26/034* (2013.01); *B23K 26/0342* (2015.10); *B23K 26/082* (2015.10); *B23K 26/34* (2013.01);
(Continued)

(58) Field of Classification Search
CPC .. B23K 26/34; B23K 26/342; B23K 26/0342; B23K 26/082; B23K 26/03; B23K 26/032; B23K 26/034; B23K 15/0086; B23K 15/08; B23K 31/125; B23K 35/0255; B33Y 10/00; B33Y 30/00; B33Y 50/00; B33Y 70/00; B33Y 50/02; B29C 64/147; B29C 64/393; B23P 15/00; B23P 2700/12
See application file for complete search history.

(56) References Cited

U.S. PATENT DOCUMENTS 4,560,855 A    12/1985 Takafuji et al.
4,937,768 A    6/1990 Carver et al.
(Continued)

FOREIGN PATENT DOCUMENTS

CN    105252145 A    1/2016
EP    0838300 A2    4/1998
(Continued)

OTHER PUBLICATIONS

European Search Report for application EP 18205651.5 (EP 3482932) dated Apr. 1, 2019 (7 pages).
(Continued)

*Primary Examiner* — Frederick C Nicolas
(74) *Attorney, Agent, or Firm* — Dinsmore & Shohl LLP

(57) ABSTRACT

The present disclosure generally relates to methods and apparatuses for additive manufacturing using foil-based build materials. Such methods and apparatuses eliminate several drawbacks of conventional powder-based methods, including powder handling, recoater jams, and health risks. In addition, the present disclosure provides methods and apparatuses for compensation of in-process warping of build plates and foil-based build materials, in-process monitoring, and closed loop control.

10 Claims, 19 Drawing Sheets

(51) Int. Cl.
  *B23K 31/12*   (2006.01)
  *B23K 35/02*   (2006.01)
  *B23K 15/00*   (2006.01)
  *B23K 15/08*   (2006.01)
  *B33Y 10/00*   (2015.01)
  *B33Y 30/00*   (2015.01)
  *B33Y 50/02*   (2015.01)
  *B33Y 70/00*   (2020.01)
  *B29C 64/147*  (2017.01)
  *B23P 15/00*   (2006.01)
  *B23K 26/082*  (2014.01)
  *B23K 26/34*   (2014.01)
  *B29C 64/393*  (2017.01)

(52) U.S. Cl.
  CPC ........ *B23K 31/125* (2013.01); *B23K 35/0255* (2013.01); *B23P 15/00* (2013.01); *B29C 64/147* (2017.08); *B29C 64/393* (2017.08); *B33Y 10/00* (2014.12); *B33Y 30/00* (2014.12); *B33Y 50/02* (2014.12); *B33Y 70/00* (2014.12); *B23P 2700/12* (2013.01)

(56) References Cited

U.S. PATENT DOCUMENTS

| | | | |
|---|---|---|---|
| 5,071,503 A | 12/1991 | Berman | |
| 5,126,529 A | 6/1992 | Weiss et al. | |
| 5,183,598 A | 2/1993 | Helle et al. | |
| 5,398,193 A | 3/1995 | Deangelis | |
| 5,432,704 A | 7/1995 | Vouzelaud et al. | |
| 5,607,540 A | 3/1997 | Onishi | |
| 5,730,817 A | 3/1998 | Feygin et al. | |
| 5,957,006 A | 9/1999 | Smith | |
| 6,056,843 A | 5/2000 | Morita et al. | |
| 6,146,487 A | 11/2000 | Lee et al. | |
| 6,441,338 B1 | 8/2002 | Rabinovich | |
| 6,562,278 B1* | 5/2003 | Farnworth | B29C 41/20 264/401 |
| 6,702,918 B2 | 3/2004 | Yang et al. | |
| 6,799,619 B2 | 10/2004 | Holmes et al. | |
| 6,909,929 B2 | 6/2005 | Farnworth et al. | |
| 6,925,346 B1 | 8/2005 | Mazumder et al. | |
| 6,966,968 B2 | 11/2005 | Chen et al. | |
| 6,974,930 B2 | 12/2005 | Jense | |
| 7,261,542 B2 | 8/2007 | Hickerson et al. | |
| 7,275,925 B2 | 10/2007 | Farnworth | |
| 7,402,219 B2 | 7/2008 | Graf | |
| 7,511,248 B2 | 3/2009 | Franchet et al. | |
| 8,359,744 B2 | 1/2013 | Hislop et al. | |
| 8,488,197 B2 | 7/2013 | Abeloe | |
| 8,524,020 B2 | 9/2013 | Lindgren et al. | |
| 8,540,501 B2 | 9/2013 | Yasukochi | |
| 8,822,875 B2 | 9/2014 | Webster et al. | |
| 8,875,767 B2 | 11/2014 | Schmid et al. | |
| 8,977,378 B2 | 3/2015 | Weinberg et al. | |
| 9,473,760 B2 | 10/2016 | Buser et al. | |
| 9,514,397 B2 | 12/2016 | Peek | |
| 9,522,426 B2 | 12/2016 | Das et al. | |
| 9,597,730 B2 | 3/2017 | Mironets et al. | |
| 2011/0101569 A1 | 5/2011 | Yasukochi | |
| 2014/0175708 A1 | 6/2014 | Echigo et al. | |
| 2015/0094837 A1 | 4/2015 | Cohen et al. | |
| 2015/0136318 A1* | 5/2015 | Tiefel | B32B 38/0008 156/272.8 |
| 2015/0251351 A1 | 9/2015 | Feygin | |
| 2015/0293722 A1 | 10/2015 | Cudak et al. | |
| 2016/0046082 A1 | 2/2016 | Fuerstenberg | |
| 2016/0129528 A1 | 5/2016 | Hyatt et al. | |
| 2016/0193688 A1 | 7/2016 | Kironn et al. | |
| 2016/0271870 A1 | 9/2016 | Brown, Jr. | |
| 2017/0014954 A1 | 1/2017 | Pomerantz | |
| 2017/0045877 A1 | 2/2017 | Shapiro et al. | |
| 2017/0050382 A1 | 2/2017 | Minardi et al. | |
| 2017/0057181 A1 | 3/2017 | Waldrop, III et al. | |
| 2018/0229332 A1* | 8/2018 | Tsai | B23K 26/22 |
| 2019/0143443 A1 | 5/2019 | Mamrak et al. | |
| 2019/0143444 A1* | 5/2019 | Mamrak | B23K 15/0086 219/76.1 |
| 2019/0143451 A1 | 5/2019 | Mamrak et al. | |
| 2019/0143452 A1* | 5/2019 | Mamrak | B23K 26/342 219/76.1 |
| 2019/0143587 A1* | 5/2019 | Mamrak | B33Y 10/00 264/401 |
| 2019/0329354 A1* | 10/2019 | Deforge | B23K 26/0643 |

FOREIGN PATENT DOCUMENTS

| | | |
|---|---|---|
| EP | 0846549 A2 | 6/1998 |
| EP | 2319641 A1 | 5/2011 |
| EP | 3095539 A1 | 11/2016 |
| EP | 3219474 A1 | 9/2017 |
| JP | S62187591 A | 8/1987 |
| JP | H4221624 A | 8/1992 |
| JP | 2017185788 A | 10/2017 |
| KR | 20000054896 A | 9/2000 |
| WO | 2015073976 A1 | 5/2015 |
| WO | WO 2015/200839 A1 | 12/2015 |
| WO | 2017029529 A1 | 2/2017 |
| WO | 2017065751 A1 | 4/2017 |

OTHER PUBLICATIONS

European Search Report for application EP 18205652.3 (EP 3482865) dated Apr. 11, 2019 (9 pages).
European Search Report for application EP 18205653.1 (EP 3482933) dated Apr. 8, 2019 (8 pages).
International Search Report and Written Opinion for application PCT/US2018/058079 dated Feb. 11, 2019 (11 pages).
English Translation of Japanese Office Action for application 2018-211870 dated Mar. 17, 2020 (3 pages).
English Translation of Japanese Office Action for application 2018-211871 dated Mar. 18, 2020 (5 pages).
English Translation of Japanese Office Action for application 2018-211872 dated Mar. 17, 2020 (5 pages).
European Office Action for application 18205653.1 dated Apr. 21, 2020 (5 pages).

\* cited by examiner

PROCESS MONITORING FOR MOBILE LARGE SCALE ADDITIVE MANUFACTURING USING FOIL-BASED BUILD MATERIALS

INTRODUCTION

The present disclosure generally relates to methods and apparatuses for additive manufacturing using foil-based build materials. More specifically, the disclosure relates to providing a layer of foil to a build area.

BACKGROUND

Additive manufacturing (AM) or additive printing processes generally involve the buildup of one or more materials to make a net or near net shape (NNS) object, in contrast to subtractive manufacturing methods. Though "additive manufacturing" is an industry standard term (ASTM F2792), AM encompasses various manufacturing and prototyping techniques known under a variety of names, including freeform fabrication, 3D printing, rapid prototyping/tooling, etc. AM techniques are capable of fabricating complex components from a wide variety of materials. Generally, a freestanding object can be fabricated from a computer aided design (CAD) model. A particular type of AM process uses electromagnetic radiation such as a laser beam, to melt or sinter a powdered material, creating a solid three-dimensional object.

An example of an apparatus for AM using a powdered build material is shown in FIG. 1. The apparatus 140 builds objects or portions of objects, for example, the object 152, in a layer-by-layer manner by sintering or melting a powder material (not shown) using an energy beam 170 generated by a source 150, which can be, for example, a laser for producing a laser beam, or a filament that emits electrons when a current flows through it. The powder to be melted by the energy beam is supplied by reservoir 156 and spread evenly over a powder bed 142 using a recoater arm 146 travelling in direction 164 to maintain the powder at a level 148 and remove excess powder material extending above the powder level 148 to waste container 158. The energy beam 170 sinters or melts a cross sectional layer of the object being built under control of an irradiation emission directing device, such as a laser galvo scanner 162. The galvo scanner 162 may comprise, for example, a plurality of movable mirrors or scanning lenses. The speed at which the energy beam is scanned is a critical controllable process parameter, impacting the quantity of energy delivered to a particular spot. Typical energy beam scan speeds are on the order of 10 to several thousand millimeters per second. The build platform 144 is lowered and another layer of powder is spread over the powder bed and object being built, followed by successive melting/sintering of the powder by the laser 150. The powder layer is typically, for example, 10 to 100 microns in thickness. The process is repeated until the object 152 is completely built up from the melted/sintered powder material. The energy beam 170 may be controlled by a computer system including a processor and a memory (not shown). The computer system may determine a scan pattern for each layer and control energy beam 170 to irradiate the powder material according to the scan pattern. After fabrication of the object 152 is complete, various post-processing procedures may be applied to the object 152. Post-processing procedures include removal of excess powder by, for example, blowing or vacuuming. Other post processing procedures include a stress relief heat treat process. Additionally, thermal and chemical post processing procedures can be used to finish the object 152.

Most commercial AM machines allow components to be built in a layer-by-layer manner using powdered build material, which has several drawbacks. Generally, loose powder materials may be selectively difficult to store and transport. There may also be health risks associated with inhalation of loose powders. Additional equipment for isolating the powder environment and air filtration may be necessary to reduce these health risks. Moreover, in some situations, loose powder may become flammable.

In view of the foregoing, non-powder-based methods and apparatuses are desirable.

SUMMARY

The following presents a simplified summary of one or more aspects of the present disclosure in order to provide a basic understanding of such aspects. This summary is not an extensive overview of all contemplated aspects and is intended to neither identify key or critical elements of all aspects nor delineate the scope of any or all aspects. Its purpose is to present some concepts of one or more aspects in a simplified form as a prelude to the more detailed description that is presented later.

In one aspect, the present disclosure is directed to an apparatus for additive manufacturing of an object, the apparatus comprising: a build plate having a build face; a build unit facing the build face, the build unit comprising a foil delivery unit and a radiation emission directing device, the build unit coupled to a positioning system capable of providing independent movement of the build unit in at least three dimensions with respect to the build plate/face; wherein the build unit is configured to move foil from the foil delivery unit into contact with the build plate, or an object thereon, so that the foil may be irradiated and incorporated into the object. In some aspects, the radiation emission directing device comprises an energy source. In some aspects, the build unit further comprises a galvo scanner. In some aspects, the energy source is a laser source. In some aspects, the energy source is an electron beam source. In some aspects, the foil delivery unit is a foil dispenser capable of storing one or more rolls of foil and dispensing a length of foil from an active roll of foil. In some aspects, the apparatus further comprises an excess collection roll. In some aspects, the foil delivery unit is a foil sheet dispenser capable of storing and dispensing foil sheets. In some aspects, the apparatus further comprises a discard bin. In some aspects, the build unit further comprises a gasflow device configured to provide a laminar gas flow substantially parallel to a face of the foil.

In another aspect, the present disclosure is directed to a method comprising: positioning a build unit with respect to a build plate having a face; dispensing, by the build unit, a layer of metal foil facing the face of the build plate; repositioning the build unit to bring the foil into contact with the face of the build plate or an object thereon; melting selected areas of the respective layer of metal foil to the working surface on the face of the build plate or the object; and removing unmelted areas of the respective layer of metal foil from the object. In some aspects, the melting selected areas of the respective layer of metal foil to the work surface comprises irradiating the selected areas with an energy beam from an energy source. In some aspects, the energy source is a laser source. In some aspects, the energy source is an electron beam source. In some aspects, the energy source is modulated by a galvo scanner. In some aspects, the dispensing by the build unit a layer of metal foil comprises dispensing a length of foil from a continuous roll of metal foil to extend a sheet of metal foil over the face of the build plate. In some aspects, the removing unmelted areas of the respective layer of metal foil comprises winding unmelted areas of the sheet of metal foil onto an excess collection roll. In some aspects, the dispensing by the build unit a layer of metal foil comprises dispensing a sheet of metal foil from a cartridge, wherein the cartridge is capable of storing a plurality of sheets of metal foil. In some aspects, the removing remaining portions of the layer of metal foil comprises moving the sheet of metal foil from the object. In some aspects, repositioning the build unit comprises positioning a gasflow device proximate to a face of the foil, to provide a laminar gas flow substantially parallel to the face of the foil.

In one aspect, the present disclosure is directed to an apparatus comprising a build plate having two opposite faces; a pair of build units on opposite faces of the build plate, each build unit comprising a foil delivery unit and a radiation emission directing device, each build unit coupled to a positioning system capable of providing independent movement of the respective build unit in at least three dimensions. In some aspects, the radiation emission directing device comprises an energy source. In some aspects, the build unit further comprises a galvo scanner. In some aspects, the energy source is a laser source. In some aspects, the energy source is an electron beam source. In some aspects, the foil delivery unit is a foil sheet dispenser capable of storing and dispensing foil sheets. In some aspects, the apparatus further comprises a discard bin. In some aspects, the foil delivery unit is a foil dispenser capable of storing one or more rolls of foil and dispensing a length of foil from an active roll of foil. In some aspects, the apparatus further comprises an excess collection roll. In some aspects, the apparatus further comprises a controller configured to control the pair of build units to concurrently build a pair of corresponding objects on the two opposite faces.

In another aspect, the present disclosure is directed to a method comprising: positioning a pair of build units with respect to a build plate having two opposite faces, each face comprising a work surface; dispensing, by each of the build units, a respective layer of metal foil over the opposite faces of the build plate; melting selected areas of the respective layer of metal foil to the work surface on each face of the build plate; and removing unmelted areas of the respective layer of metal foil. In some aspects, the melting selected areas of the respective layer of metal foil to the work surface comprises irradiating the selected areas with an energy source. In some aspects, the energy source is a laser source. In some aspects, the energy source is an electron beam source. In some aspects, the energy source is modulated by a galvo scanner. In some aspects, the dispensing by each of the build units a respective layer of metal foil comprises dispensing a sheet of metal foil from a cartridge, wherein the cartridge is capable of storing a plurality of sheets of metal foil. In some aspects, the removing unmelted areas of the respective layer of metal foil comprises moving the sheet from the work surface to a discard bin. In some aspects, the dispensing by each of the build units a respective layer of metal foil comprises dispensing a length of foil from a continuous roll of metal foil to extend a sheet of metal foil over the face of the build plate. In some aspects, the removing unmelted areas of the respective layer of metal foil comprises winding unmelted areas of the sheet of metal foil onto an excess collection roll. In some aspects, the dispensing, melting, and removing are performed concurrently by each of the build units based on a control signal from a controller.

In another aspect, the present disclosure is directed to a method of vectorization for foil-based build materials, comprising: receiving a representation of a layer to be formed by fusing one or more regions of a foil sheet to a workpiece; determining that at least a first region of the one or more regions defines an unfused opening isolated from a remaining portion of the foil sheet; dividing the first region into at least two scan areas, wherein a fragment of the unfused opening adjacent each scan area is connected to the remaining portion; fusing a first scan area of the at least two scan areas to the workpiece; moving the foil sheet; and fusing a second scan area of the at least two scan areas to the workpiece. In some aspects, the method further comprises determining that a second unfused opening isolated from the remaining portion of the foil sheet has an area less than a threshold; and ablating the second opening. In some aspects, the ablating comprises ablating the second unfused portion when the foil sheet is not in contact with the workpiece. In some aspects, moving the foil sheet comprises: separating the foil sheet from the workpiece; repositioning the foil sheet relative to the workpiece; and bringing the foil sheet into contact with the workpiece. In some aspects, an edge of the first scan area contacts an edge of the second scan area. In some aspects, the workpiece includes an empty space between the first scan area and the second scan area. In some aspects, the method further comprises: dividing a second region into at least a third scan area and a fourth scan area; repositioning at least one of the third scan area and the fourth scan area; fusing the third scan area to the workpiece; moving the foil sheet; and fusing a fourth scan area of the at least two scan areas to the work piece adjacent the third scan area. In some aspects, dividing the second region comprises: determining that a surface area of a portion of the second region is less than an area of the remaining portion exterior to the first region; and designating the portion of the second region as the third scan area, wherein repositioning at least one of the third scan area and the fourth scan area comprises moving the third scan area to the remaining portion exterior to the first region. In some aspects, dividing the second region comprises: determining that a width of a portion of the second region along an axis is less than a threshold; and designating the portion of the second region as the third scan area, wherein repositioning at least one of the third scan area and the fourth scan area comprises moving the third scan area.

In another aspect, the present disclosure is directed to an apparatus for forming an object using foil-based build materials, comprising: a build plate having a build face; a foil delivery unit; a radiation emission directing device; and a controller configured to: receive a representation of a layer to be formed by fusing one or more regions of a foil sheet to a workpiece; determine that at least a first region of the one or more regions defines an unfused opening isolated from a remaining portion of the foil sheet; dividing the first region into at least two scan areas, wherein a fragment of the unfused opening adjacent each scan area is connected to the remaining portion; control the radiation emission directing device to fuse a first scan area of the at least two scan areas to the workpiece; control the foil delivery unit to move the foil sheet; and control the radiation emission directing device to fuse a second scan area of the at least two scan areas to the workpiece. In some aspects, the controller is configured to: determine that a second unfused opening isolated from the remaining portion of the foil sheet has an area less than a threshold; and ablate the second unfused opening. In some aspects, the controller is configured to ablate the second unfused portion when the foil sheet is not in contact with the workpiece. In some aspects, the controller is configured to: separate the foil sheet from the workpiece; reposition the foil sheet relative to the workpiece; and bring the foil sheet into contact with the workpiece. In some aspects, an edge of the fused first scan area contacts an edge of the fused second scan area. In some aspects, the workpiece includes an empty space between the first scan area and the second scan area. In some aspects, the controller is configured to: divide a second region into at least a third scan area and a fourth scan area; reposition at least one of the third scan area and the fourth scan area; fuse the third scan area to the workpiece; move the foil sheet; and fuse a fourth scan area of the at least two scan areas to the workpiece adjacent the third scan area. In some aspects, the controller is configured to: determine that a surface area of a portion of the second region is less than an area of the remaining portion exterior to the first region; and designate the portion of the second region as the third scan area; and move the third scan area to the remaining portion exterior to the first region. In some aspects, the controller is configured to: determine that a width of a portion of the second region along an axis is less than a threshold; and designate the portion of the second region as the third scan area, wherein repositioning at least one of the third scan area and the fourth scan area comprises moving the third scan area. In some aspects, the apparatus further comprises a positioning system capable of providing independent movement of the foil delivery unit and the radiation emission directing device in at least three dimensions with respect to the build face.

In another aspect, the present disclosure is directed to an apparatus for additive manufacturing of an object, the apparatus comprising: a build plate having a build face; a build unit facing the build face, the build unit comprising: a foil delivery unit, and a radiation emission directing device, wherein the build unit is configured to move foil from the foil delivery unit into contact with the build plate, or an object thereon, so that the foil may be irradiated and incorporated into the object; and one or more detectors configured to inspect one or more of the foil, the object, and radiation emitted or received by the radiation emission directing device. In some aspects, the apparatus further comprises a controller configured to receive data from the one or more detectors and adjust one or more of radiation emitted by an energy source and/or the radiation emission directing device, the foil delivery unit, the build unit, or the one or more detectors based on the received data. In some aspects, the one or more detectors is located between the build plate and the foil delivery unit and is configured to inspect the object. In some aspects, the one or more detectors comprises a thermal scanner configured to inspect the object and generate a thermal profile of the object. In some aspects, the one or more detectors comprises an electromagnetic detector configured to apply an electric current to the object and measure a magnetic property of eddy currents generated within the object. In some aspects, the one or more detectors comprises a computerized tomography scanner. In some aspects, the one or more detectors are configured to inspect before completion of the object. In some aspects, the apparatus further comprises a foil collection device configured to receive a remaining portion of the foil after irradiation, wherein the one or more detectors configured to inspect the remaining portion.

In another aspect, the present disclosure is directed to a method comprising: positioning a build unit with respect to a build plate having a face; dispensing, by the build unit, a layer of metal foil facing the face of the build plate; repositioning the build unit to bring the foil into contact with the face of the build plate or an object thereon; melting selected areas of the respective layer of metal foil to the work surface on the face of the build plate or the object; removing remaining portions of the respective layer of metal foil from the object; and inspecting, by a detector, at least one of the layer of metal foil, the object, or the remaining portions of the respective layer of metal foil. In some aspects, the method includes at least one step of inspecting, by a detector, the layer of metal foil before the melting or inspecting, by a detector, the object. In some aspects, the method further comprises transmitting data on the layer of metal foil from the detector to a controller, comparing the data to a model for the foil, and adjusting the foil according to the model. In some aspects, the method further comprises transmitting data on the object from the detector to a controller, and comparing the data to a model for the object. In some aspects, the method further comprises: determining that the data on the object differs from the model for the object by more than a threshold amount; and stopping a build process for the object.

These and other aspects of the invention will become more fully understood upon a review of the detailed description, which follows.

DETAILED DESCRIPTION

Figure 1:
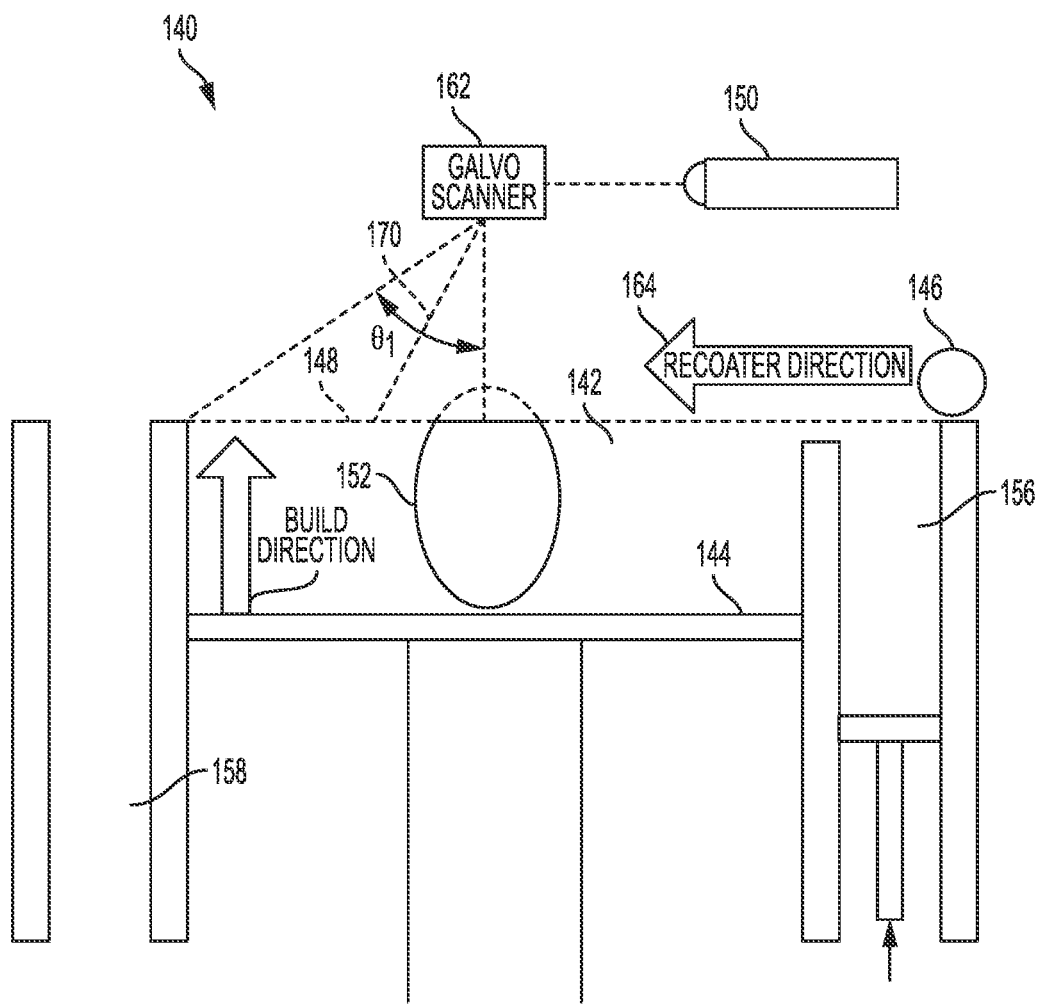
FIG. 1 shows an example of an apparatus for AM according to conventional methods.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

Mobile Large Scale Additive Manufacturing Using Foil-Based Build Materials

The present application is directed to methods and apparatuses for mobile large scale additive manufacturing using foil-based build materials. According to the present disclosure, additive manufacturing is carried out on a face of a build plate, using foil-based build materials. Using a sheet of a thin "foil" metal placed above a region of interest allows the user to incident the opposite side of the foil with a radiation source and weld the foil immediately under the irradiation point to the surface below. Such technology creates a new layer of the object from the foil in the same manner as a conventional powder bed printer. However, the methods of the present disclosure have the advantages of no powder handling, no recoat or recoat time, no recoater jams, and gravitational decoupling, as the technology may be operated to print at angles, upside down, or in zero gravity.

In some aspects, the method and apparatus of the present disclosure may also include process monitoring. With no powder bed, the growing part or object may always be visible. This visibility allows for real-time inspection including, but not limited to, surface finish inspection; dimensional tolerance examination, either via probe, laser ranger, or camera; and microscopic metallurgical inspection. In some aspects, process monitoring may include post-inspection of the finished object or part, of the most recently completed layer, of remaining portions of the foil, or a combination of the foregoing. Process monitoring according to the present disclosure may facilitate determination of part or object health earlier than in powder bed-based additive manufacturing. Existing technologies and modalities for process monitoring, such as CT scanning, may be able to be used with the present disclosure, either in series or in parallel with the build process, or post-building.

Some such aspects may further include closed loop control, which can provide the capability to perform layer-by-layer monitoring of deformation models and adjustment of the build process as unwanted geometrical (or other) characteristics emerge. In addition to correcting object characteristics, process monitoring and closed loop control may also facilitate monitoring the condition of additive manufacturing equipment. The visibility of the part during its build enables real-time feedback and correction. In some aspects, a multi-sensor closed loop algorithm may be used for modification of the scan progress. Improved inspection capabilities may facilitate "on-the-fly" build compensation to obtain a more desirable end product (i.e., the object) with regards to the product geometry or other properties.

As used herein, a "foil-based build material" is a continuous, uniform, solid, thin sheet of metal, conventionally prepared by hammering or rolling. In some aspects of the present disclosure, foil-based build materials do not comprise a backing or carrier. Foils suitable for use with the present disclosure may be used in the form of rolls of foil, which may or may not be pre-perforated, or in the form of pre-cut sheets of foil. Foil-based build materials suitable for use with the present disclosure include, but are not limited to, aluminum, cobalt-chrome, HS188, maraging steel, stainless steels, tooling steel, nickel, titanium, copper, tin, cobalt, niobium, tantalum, gamma titanium aluminide, Inconel 625, Inconel 718, Inconel 188, Haynes 188®, Haynes 625®, Super Alloy Inconel 625™, Chronin® 625, Altemp® 625, Nickelvac® 625, Nicrofer® 6020, Inconel 188, and any other material having material properties attractive for the formation of components using the abovementioned techniques.

As used herein, a material is "opaque" to radiation if the material does not transmit incoming radiation.

As used herein, to "modulate" an energy beam from an energy source includes one or more of adjusting an angle of the beam, adjusting a focus of the beam, and translating a radiation emission directing device in at least one dimension. Suitable radiation emission directing devices for use according to the present disclosure include, but are not limited to, galvo scanners and deflecting coils. In some aspects, a radiation emission directing device may modulate an energy beam from an energy source by bending and/or reflecting the energy beam to scan different regions on a build face and/or by xyz motion of the radiation emission directing device, which may optionally be housed in a build unit.

As used herein, "radiation" refers to energy in the form of waves or particles, including, but not limited to, heat, radio waves, visible light, x-rays, radioactivity, acoustic radiation, and gravitational radiation.

FIGS. 2A-2D show schematic diagrams of an apparatus 240 according to a first embodiment of the present disclosure.

Figure 2A:
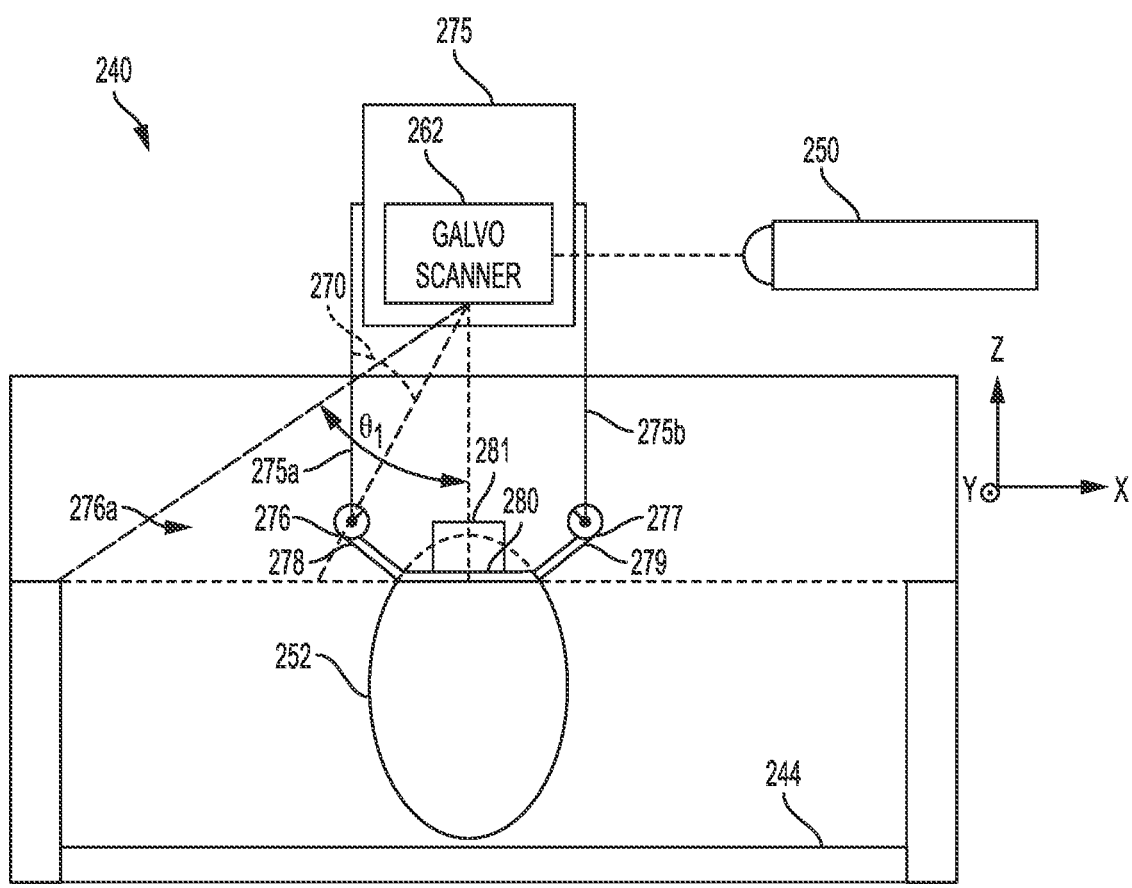
FIG. 2A shows a schematic diagram of an apparatus for AM according to a first embodiment of the present disclosure.

Apparatus 240 comprises a build plate with a face 244, which is available for building an object by additive manufacturing (FIG. 2A). In some aspects, the build plate and the face 244 lie in an xy-plane, with building occurring in the z-direction relative to face 244. As used herein, the term "above" may mean spaced apart in the z-direction. It should be appreciated that the apparatus 240 may not be confined to a particular gravitational orientation. That is, although the z-direction extends vertically opposite a gravitational direction for the conventional apparatus 100, the apparatus 240 may operate with a z-direction transverse to the gravitational direction, opposite the gravitation direction, or in zero gravity.

A build unit 275 comprising positioning system 275a, 275b for foil delivery unit 276a, comprising foil supply 276 and foil collector 277, is used to build an object 252 using foil 278. In some aspects, positioning system 275a, 275b allows movement of foil delivery unit 276a in three dimensions. In some aspects, build unit 275 houses a radiation emission directing device, such as galvo scanner 262, which may be used to modulate energy beam 270 from energy source 250. For example, the galvo scanner 262 may reflect or bend the energy beam 270 to scan different regions on the face 244 or an object thereon. In such aspects, by moving to a particular location with respect to the face 244, the build unit 275 may limit the angle $\theta_2$ of energy beam 270 used to scan the face 244. The limited angle may provide more consistent melting of the foil. In other aspects, galvo scanner 262 is not contained within build unit 275.

In some aspects, energy source 250 is a laser source. In other aspects, energy source 250 is an electron beam source. In such aspects, the apparatus 240 is operated under vacuum conditions. In some such aspects, the radiation emission directing device is a deflecting coil. The energy source 250 may be a laser source under either vacuum or non-vacuum conditions.

In some aspects, build unit 275 is attached to a positioning system, such as a gantry or a multidimensional coordinated head (for example, a robot arm), movable in at least three dimensions, which may be, e.g., x, y, and z coordinates, during operation, in order to position the radiation emission directing device (pictured as galvo scanner 262) and/or foil delivery unit 276a relative to build plate face 244 and/or object 252. In addition, build unit 275 is preferably rotatable in all directions, with roll, pitch, and yaw. As a result, build unit 275 is preferably able to operate upside down or at any angle.

In a first embodiment, foil delivery unit 276a supplies a continuous roll of a build material in the form of a foil.

Figure 2B:
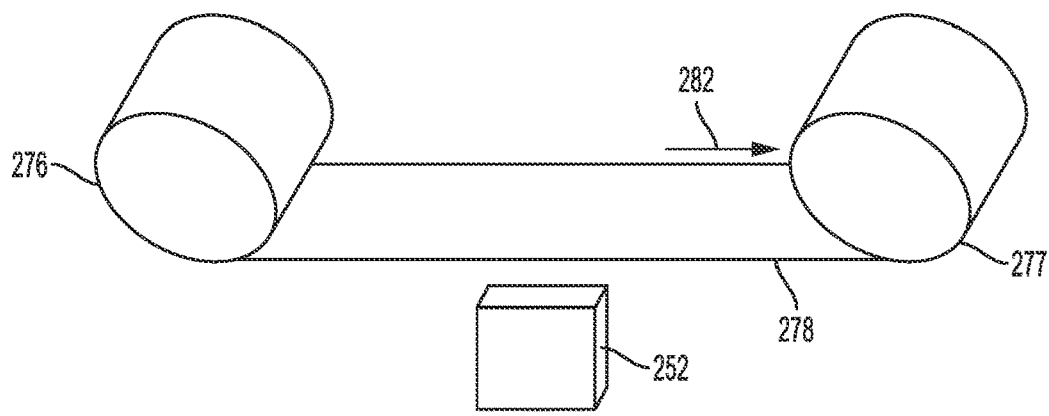
FIG. 2B shows a schematic diagram of supplying a length of fresh build material according to a first embodiment of the present disclosure.
Figure 2C:
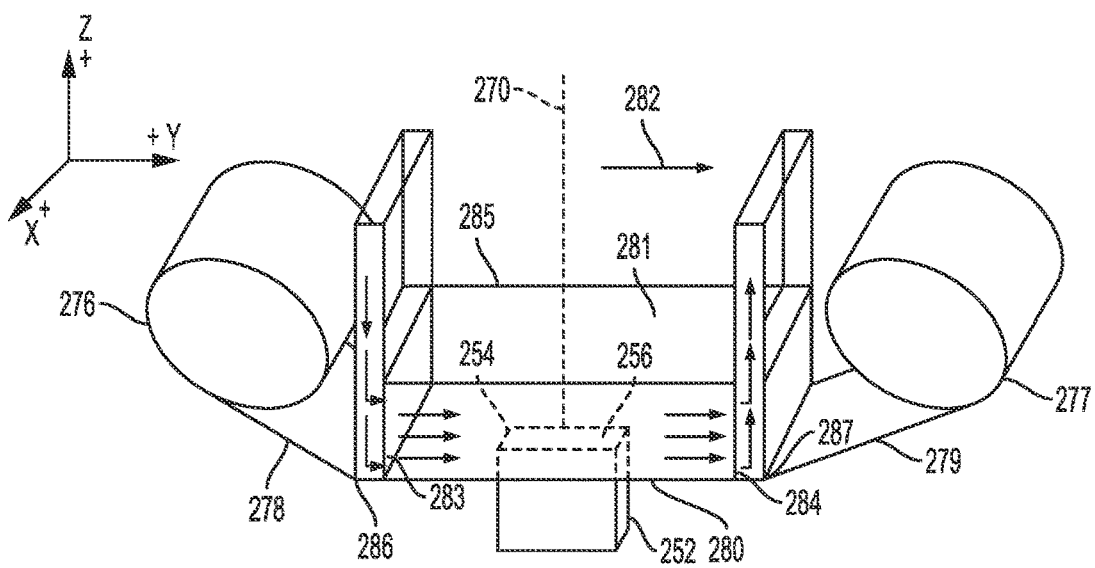
FIG. 2C shows a schematic diagram of cutting and irradiating a portion of build material in the preparation of a new layer according to a first embodiment of the present disclosure.
Figure 2D:
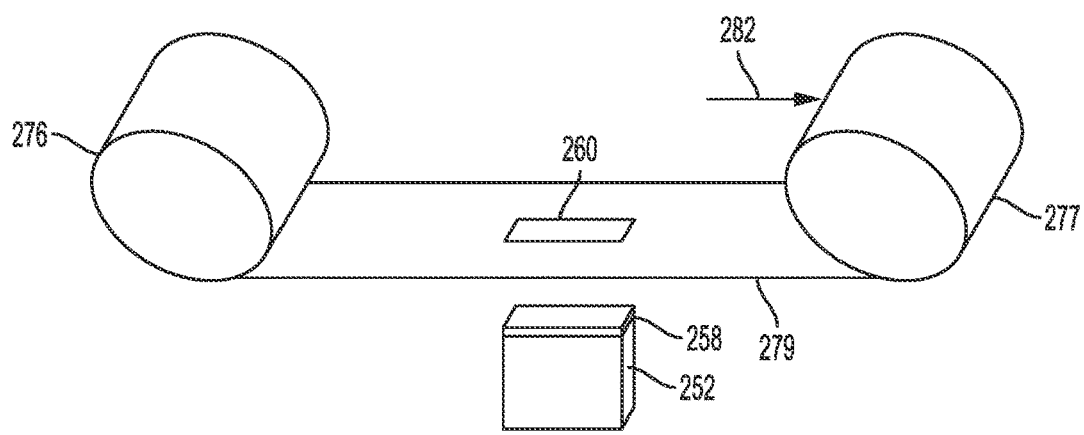
FIG. 2D shows a schematic diagram of the apparatus after fusing of the new layer to the object according to a first embodiment of the present disclosure.

FIGS. 2B-2D represent steps of a method of additive manufacturing according to a first embodiment of the present disclosure. In some aspects, the foil delivery unit 276a contains a foil supply roll 276 and a collection roll 277. Supply roll 276 supplies a length of fresh foil 278, which extends over a build plate face 244, upon which object 252 is built, in direction 282 towards collection roll 277 (FIGS. 2A-2B).

In some aspects, supply roll 276 is supplied as a cartridge to be installed in the foil delivery unit. The cartridge may be a sealed unit that protects the foil from external elements prior to insertion into the apparatus 240. In such aspects, the cartridge may supply foil manually or automatically after cartridge insertion. In such aspects, after all of the materials from the cartridge are expended, the cartridge can be removed or deposited off, and a fresh cartridge can be inserted (manually) or picked up (automatically), allowing the build process to continue.

In some aspects, a laminar gas flow 281 is applied to the build area (FIG. 2C). Suitable gases for use in laminar gas flow include, but are not limited to, nitrogen, argon, helium, and combinations thereof. Laminar flow may be effected by any suitable means known to those of ordinary skill in the art, such as by using a gasflow device 285, e.g., as disclosed in U.S. patent application Ser. No. 15/406,454, filed Jan. 13, 2017, which is herein incorporated by reference in its entirety. In some aspects, the gasflow device 285 may be adapted to provide a reduced oxygen environment. During operation, if a laminar gas flow is used, then the energy source 250 is a laser source and energy beam 270 is a laser beam. This facilitates removal of the effluent plume caused by laser melting.

When a layer of foil is irradiated, smoke, condensates, and other impurities flow into the laminar gasflow zone 281 and are transferred away from the foil and the object being formed by the laminar gas flow. The smoke, condensates, and other impurities flow into the low-pressure gas outlet portion and are eventually collected in a filter, such as a HEPA filter. By maintaining laminar flow, the aforementioned smoke, condensates, and other impurities can be efficiently removed while also rapidly cooling melt pool(s) created by the laser, without disturbing the foil layer, resulting in higher quality parts with improved metallurgical characteristics. In an aspect, the gas flow in the gasflow volume is at about 3 meters per second. The gas may flow in either the x or the y direction.

The oxygen content of the second controlled atmospheric environment, if present, is generally approximately equal to the oxygen content of the first controlled atmospheric environment (the laminar gas flow zone 281), although it does not have to be. The oxygen content of both controlled atmospheric environments is preferably relatively low. For example, it may be 1% or less, or more preferably 0.5% or less, or still more preferably 0.1% or less. The non-oxygen gases may be any suitable gas for the process. For example, nitrogen obtained by separating ambient air may be a convenient option for some applications. Some applications may use other gases such as helium, neon, or argon. An advantage of the present disclosure is that it is much easier to maintain a low-oxygen environment in the relatively small volume of the first and second controlled atmospheric environments. It is preferable that only relatively smaller volumes require such relatively tight atmospheric control, as disclosed in U.S. patent application Ser. No. 15/406,454, filed Jan. 13, 2017, which is herein incorporated by reference in its entirety. Therefore, according to the present disclosure, it is preferable that the first and second controlled atmospheric environments may be, for example, 100 times smaller in terms of build volume than the build environment. The first gas zone, and likewise the gasflow device 285, may have a largest xy cross-sectional area that is smaller than the smallest xy cross-sectional area of the object 252. There is no particular limit on the size of the object 252 relative to the first gas zone 281 and/or the gasflow device 285. Advantageously, the radiation emission directing device (illustrated, for example, as galvo scanner 262) fires through the first and second gas zones, which are relatively low oxygen zones. When the first gas zone is a laminar gas flow zone 281, with substantially laminar gas flow, the energy beam 270 is a laser beam with a more clear line of sight to the object, due to the aforementioned efficient removal of smoke, condensates, and other contaminants or impurities.

In some aspects, the build unit comprises a gasflow device 285 adapted to provide a substantially laminar gas flow to a laminar gas flow zone 281 within two inches of, and substantially parallel to, a work surface, such as build plate 244 or an object 252 thereon. The gasflow device 285 may be adapted to maintain a laminar gas flow zone 281, to provide a low oxygen environment around the work surface in a region below the build unit. There may also be a reduced oxygen gas zone above the laminar gas flow zone 281. In some aspects, both gas zones may be contained within a containment zone surrounding at least the build unit and positioning system. In some aspects, the build unit may be at least partially enclosed to form a low oxygen environment above the build area of the work surface, i.e., around the path of the beam 270.

In the embodiment illustrated in FIG. 2B, the laminar gas flow zone 281 is essentially the volume of gasflow device 285, i.e., the volume defined by the vertical (xz) surfaces of pressurized inlet portion 283 and pressurized outlet portion 284 and by extending imaginary surfaces from the respective upper and lower edges of the inlet portion to the upper and lower edges of the outlet portion of the xy plane.

In some aspects, laminar gas flow 281 is applied substantially parallel to the face of the length of fresh foil 278 not facing the object 252 or the build plate face 244, giving rise to an active foil 280. Positioning gasflow device 285 and application of laminar gas flow 281 minimizes any distance between active foil 280 and object 252 or, when building the initial layer of the object 252, between active foil 280 and build plate face 244, thusly establishing contact between active foil 280 and object 252 or, when building the initial layer of the object, between active foil 280 and the build plate face 244. In some aspects, the apparatus 240 may further comprise rollers to help establish contact between active foil 280 and object 252 or, when building the initial layer of the object, between active foil 280 and build plate/face 244. The rollers may move in the z-direction with respect to the foil supply roll 276 to bring the active foil 280 into contact with the object 252 or the build plate face 244, such as by forming bends 286, 287 in active foil 280, and to retract the active foil 280 therefrom.

Energy beam 270 is then used to cut active foil 280 (FIG. 2C) in order to produce an additional layer 258 (FIG. 2D). As used herein, "cutting" the active foil according to the present disclosure refers to detaching the additional layer 258 (or the portion of foil 280 that will become additional layer 258) from the bulk of active foil 280. The cutting is preferably performed by the energy beam 270. In some aspects, layer 258 may be the initial layer in the manufacture of object 252. In some aspects, layer 258 may be the final layer in the manufacture of object 252. In some aspects, layer 258 may be an intermediate layer in the manufacture of object 252.

In some aspects, energy beam 270 first irradiates along a perimeter 254 of the layer 258 to be added in order to fuse active foil 280 to object 252 at perimeter 254 (FIG. 2C). In some aspects, the irradiation simultaneously cuts through active foil 280. In other aspects, energy beam 270 cuts active foil 280 along perimeter 254 prior to irradiation within perimeter 254 to fuse the layer 258 to object 252. In other aspects, energy beam 270 irradiates along perimeter 254 in order to fuse active foil 280 to object 252 at perimeter 254, and then energy beam 270 cuts active foil 280 along perimeter 254.

In some aspects, after cutting and irradiation (simultaneously or sequentially in either order) along perimeter 254, energy beam 270 irradiates area 256 in a raster-fill manner, to fuse active foil 280 to the object 252.

In other aspects, energy beam 270 first irradiates area 256 in a raster-fill manner, to fuse active foil 280 to the object 252, and then cuts and irradiates along perimeter 254 of the layer added. In such aspects, the cutting and irradiation along perimeter 254 may occur simultaneously or sequentially in either order.

Suitable settings for the energy beam 270, energy source 250, and/or the radiation emission directing device (illustrated as, e.g., galvo scanner 262) for cutting active foil 280 and for irradiating active foil 280 either along perimeter 254 or in area 256 are known or can be determined by those of ordinary skill in the art.

Completion of cutting and irradiation along perimeter 254 creates a hole 260, wherefrom new layer 258 was added to object 252, in remaining portion 279 (FIG. 2D). In some aspects, the laminar gas flow 281 may be reduced or eliminated upon creation of hole 260 and/or raster-filling of area 256, to enhance separation of remaining portion 279 from object 252. Remaining portion 279 may then be advanced in direction 282 onto collection roll 277, to provide a fresh length of foil 278 to build the next layer. In some aspects, no further layers are built. In some aspects, one or more further layers are built.

Figure 2E:
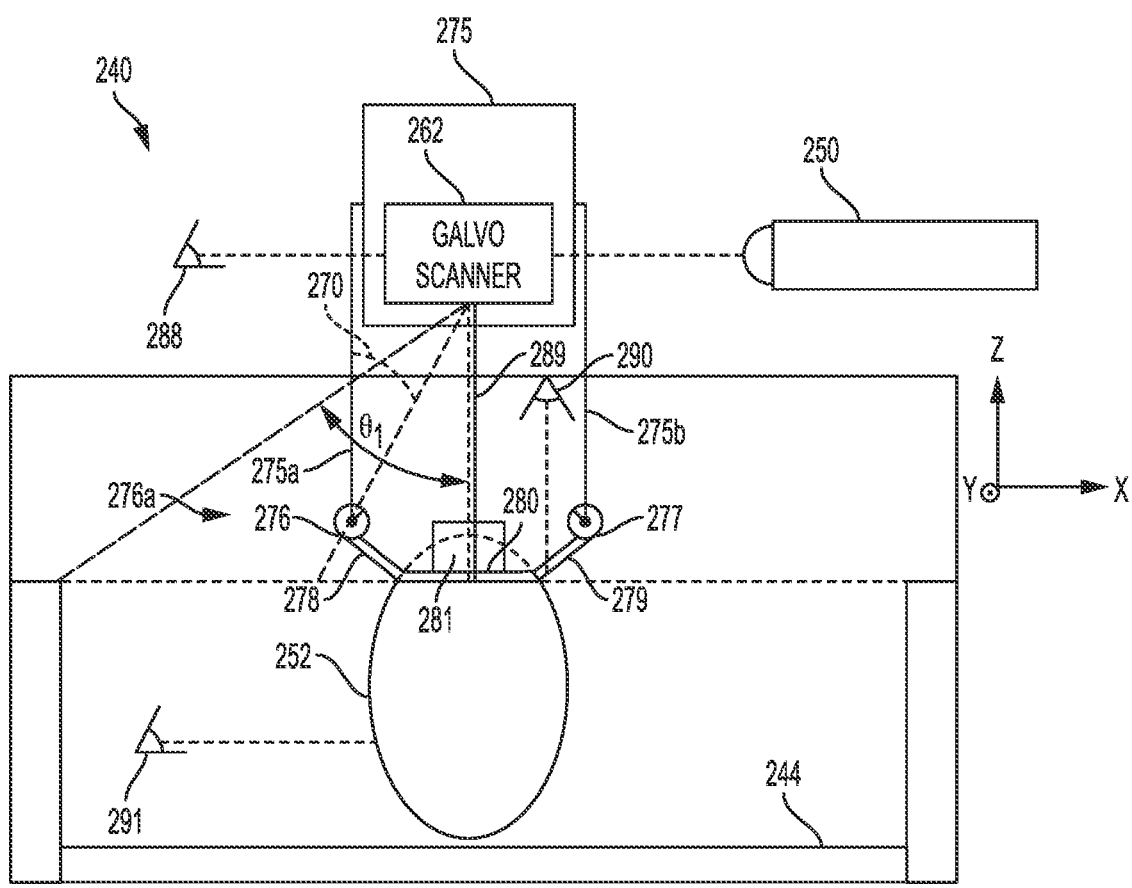
FIG. 2E shows a schematic diagram of an apparatus for AM with process monitoring according to a first embodiment of the present disclosure.

In some aspects, apparatus 240 may further comprise one or more detectors for process monitoring (FIG. 2E). The build process depicted in FIGS. 2B-2D reflects return radiation beam 289, which travels back to the galvo scanner 262 and then to photodetector 288, which analyzes return radiation beam 289 for properties such as, but not limited to. In addition, apparatus 240 may further comprise detectors 290, 291 to inspect the foil and the object 252, respectively. Inspection by detector 290 of the foil may include inspection of one or more of the foil supply 276, collection roll 277, fresh foil 278, active foil 280, and remaining portion 279. Detector 291 may be located below a current build layer. That is, at least once the object 252 reaches a threshold size in the z-dimension, the detector 291 extends in the z-dimension less than the size of the object 252 in the z-dimension. This position allows the detector 291 to directly observe the object 252 without the build unit 275 interfering in the observation. Additionally, such a perspective may not be available in a powder based apparatus because unfused powder would prevent direct observation of the object 252. The detector 291 may provide feedback regarding finished portions of the object 252 before the entire object 252 has been completed. Detectors 290, 291 may be each independently be any suitable detector, such as, but not limited to a camera or a thermal scanner. In an aspect, the detector 291 may be an electromagnetic detector. The detector 291 may apply an electric current to the object 252. The detector 291 may observe eddy currents within the object 252. The eddy currents may indicate gaps or fractures within the object 252 that alter an expected pattern. Accordingly, defects may be detected at an early stage of the build process.

In some aspects, detectors 288, 290, and 291 transmit data to a controller, which may be a computer. In some aspects, the method may include adjusting the build process in response to the data. Suitable adjustments can be determined by those of ordinary skill in the art based on the data and on knowledge of the desired object 252 to be built. Suitable adjustments may include, but are not limited to, adjusting one or more of the frequency or intensity of energy beam 270; repositioning one or more of the supply roll 276, excess collection roll 277, gasflow device 285, build unit 275, and detectors 288, 290, or 291. Adjustments may be made by a controller, such as a computer, either automatically or manually.

FIGS. 3A-D show schematic diagrams of an apparatus 340 according to a second embodiment of the present disclosure. Apparatus 340 may be similar in some aspects to apparatus 240.

Figure 3A:
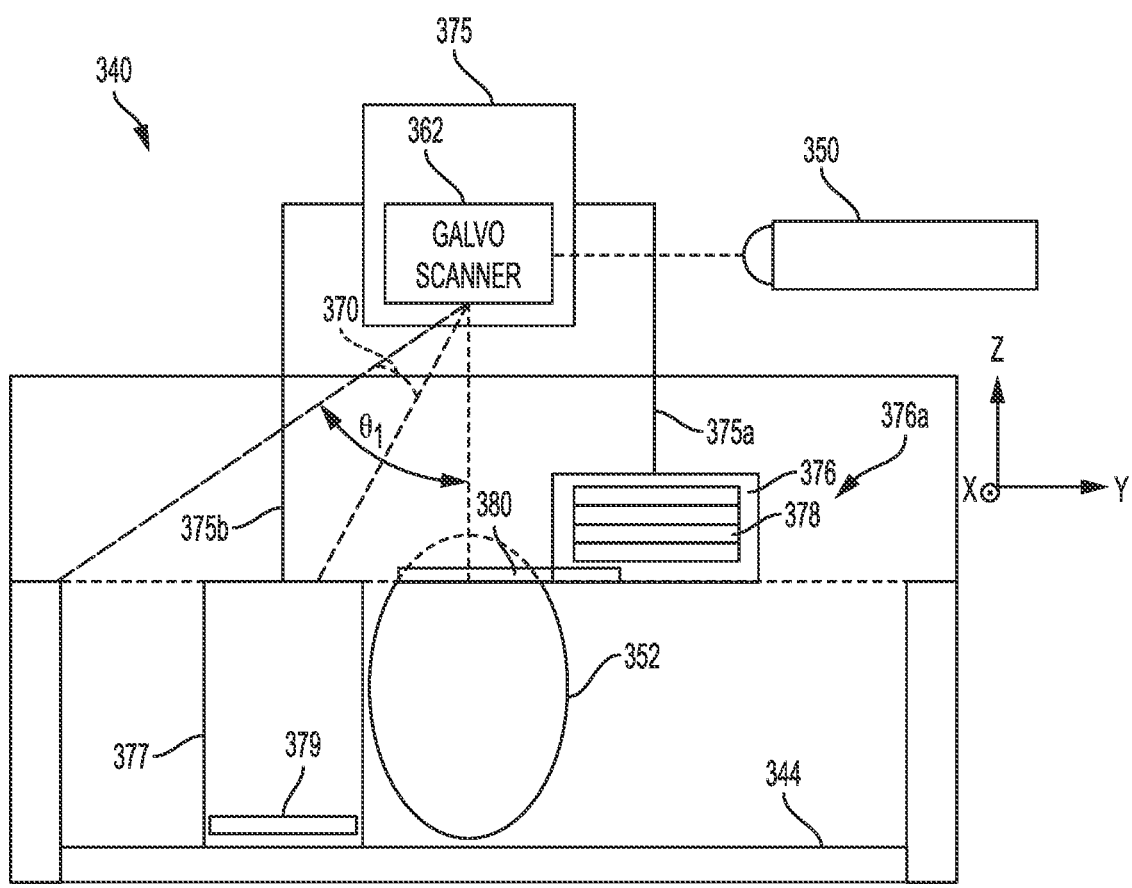
FIG. 3A shows a schematic diagram of an apparatus for AM according to a second embodiment of the present disclosure.

Apparatus 340 comprises a build plate with a face 344, which is available for building an object by additive manufacturing (FIG. 3A). In some aspects, the build plate and the face 344 lie in an xy-plane, with building occurring in the z-direction relative to face 344. As used herein, the term "above" may mean spaced apart in the z-direction. It should be appreciated that the apparatus 340 may not be confined to a particular gravitational orientation. That is, although the z-direction extends vertically opposite a gravitational direction for the apparatus 100, the apparatus 340 may operate with a z-direction transverse to the to the gravitational direction, opposite to the gravitational direction, or in zero gravity.

A build unit 375 comprising positioning system 375*a*, 375*b* for foil delivery unit 376*a*, comprising foil supply 376 and foil collector 377, is used to build an object 352 using foil 378. In some aspects, positioning system 375*a*, 375*b* allows movement of foil delivery unit 376*a* in three dimensions. Build unit 375 may be similar in some aspects to build unit 275. In some aspects, build unit 375 houses a radiation emission directing device, such as galvo scanner 362, which may be used to modulate energy beam 370 from energy source 350. For example, galvo scanner 362 may reflect or bend the energy beam 370 to scan different regions on the face 344 or an object thereon. In such aspects, by moving to a particular location with respect to face 344, the build unit 375 may limit the angle $\theta_3$ of energy beam 370 used to scan the face 344. This limited angle may provide more consistent melting of the foil. In other aspects, galvo scanner 362 is not contained within build unit 375.

In some aspects, energy source 350 is a laser source. In other aspects, energy source 350 is an electron beam source. In such aspects, the apparatus 340 is operated under vacuum conditions. In some such aspects, the radiation emission directing device is a deflecting coil. The energy source 350 may be a laser source under either vacuum or non-vacuum conditions.

In some aspects, build unit 375 is attached to a positioning system, such as a gantry, movable in at least three dimensions, which may be, e.g., x, y, and z coordinates, during operation, in order to position the radiation emission directing device (illustrated as, e.g., galvo scanner 362) and/or foil delivery unit 376*a* relative to build plate face 344 and/or object 352. In addition, build unit 375 is preferably rotatable in at least two dimensions, i.e., in the xy-plane, about the z-axis.

In a second embodiment, foil delivery unit 376*a* supplies pre-cut sheets of foil.

Figure 3B:
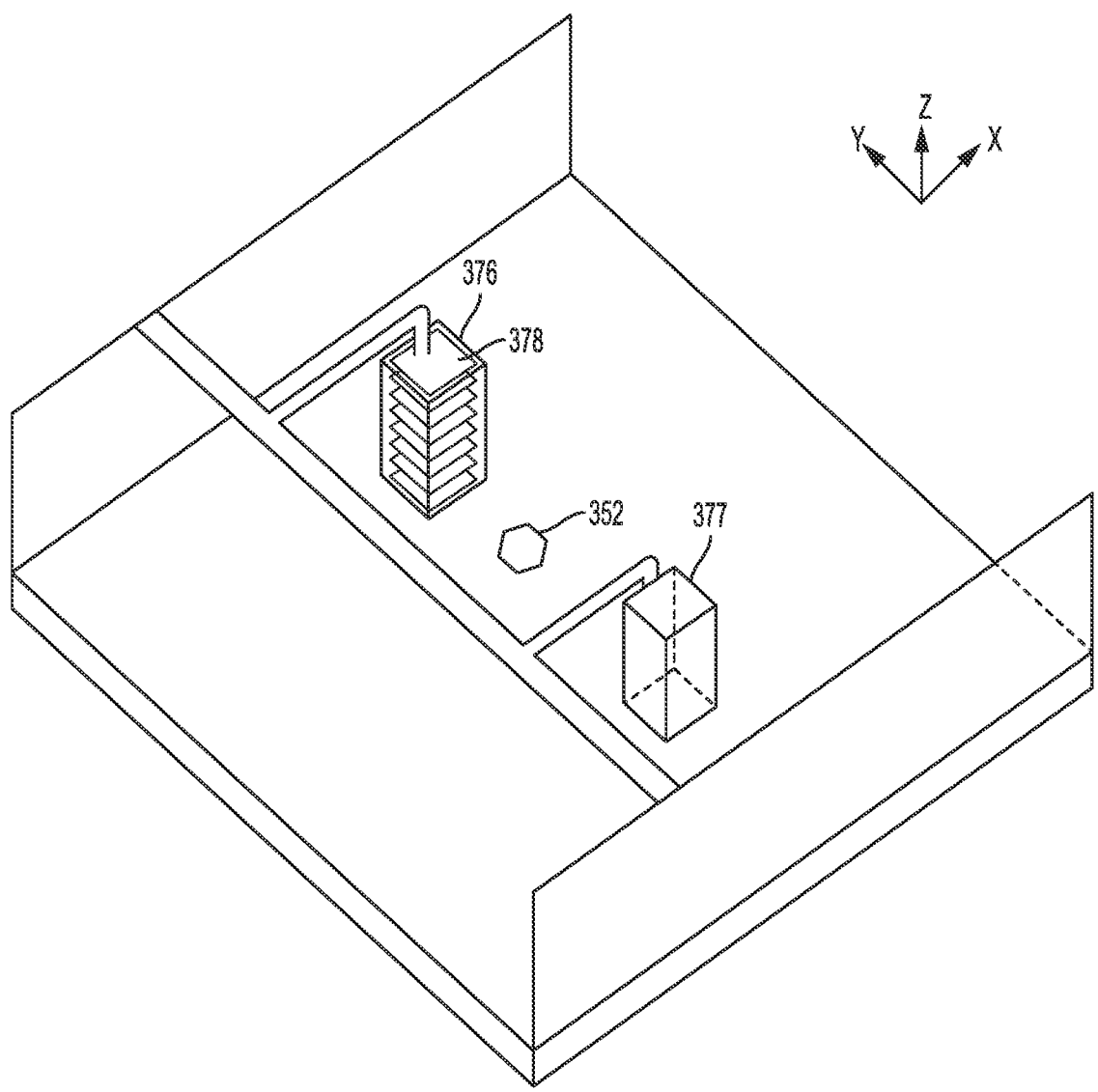
FIG. 3B shows a schematic diagram of supplying a sheet of fresh build material according to a second embodiment of the present disclosure.
Figure 3C:
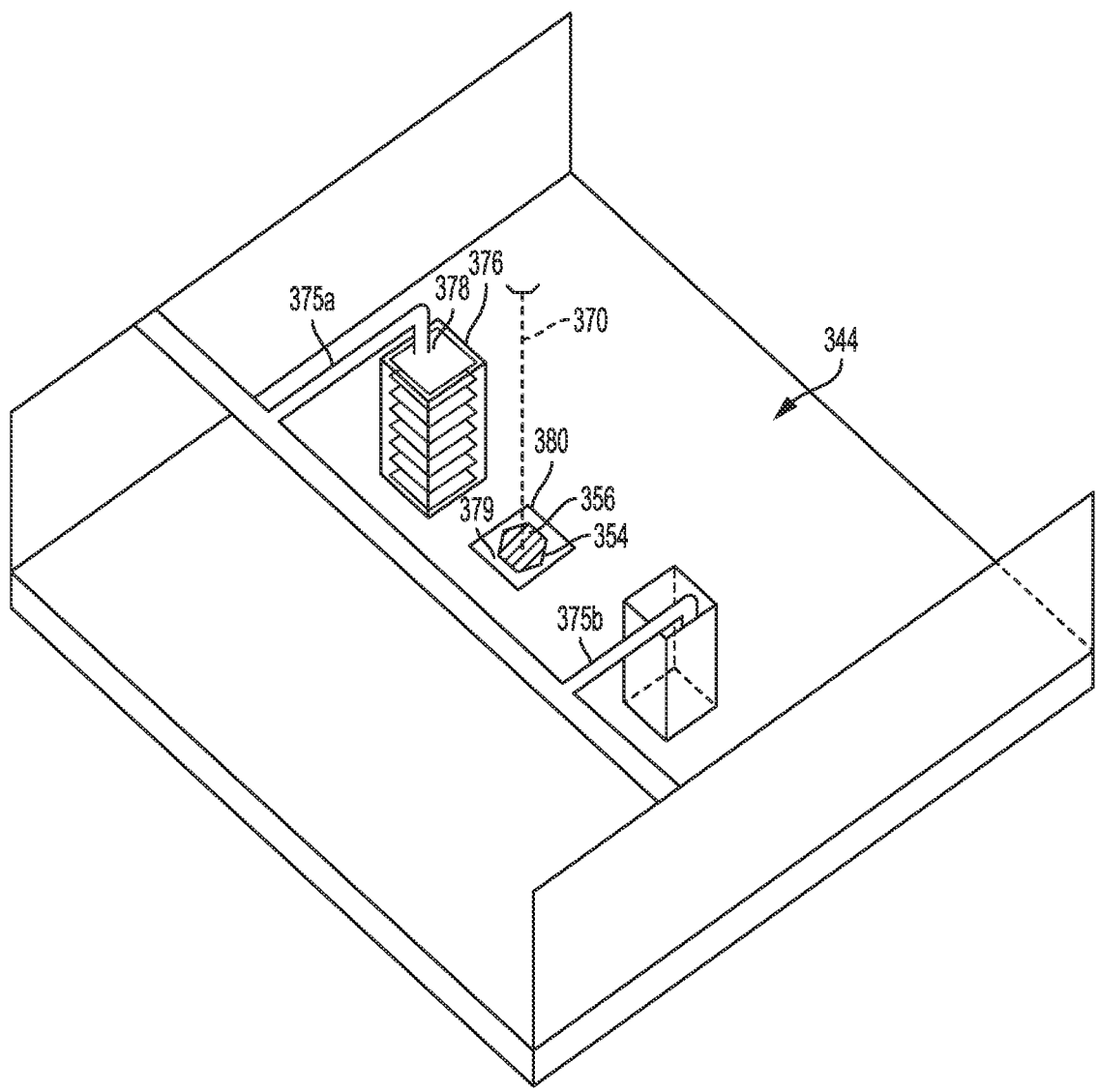
FIG. 3C shows a schematic diagram of cutting and irradiating a portion of build material in the preparation of a new layer according to a second embodiment of the present disclosure.
Figure 3D:
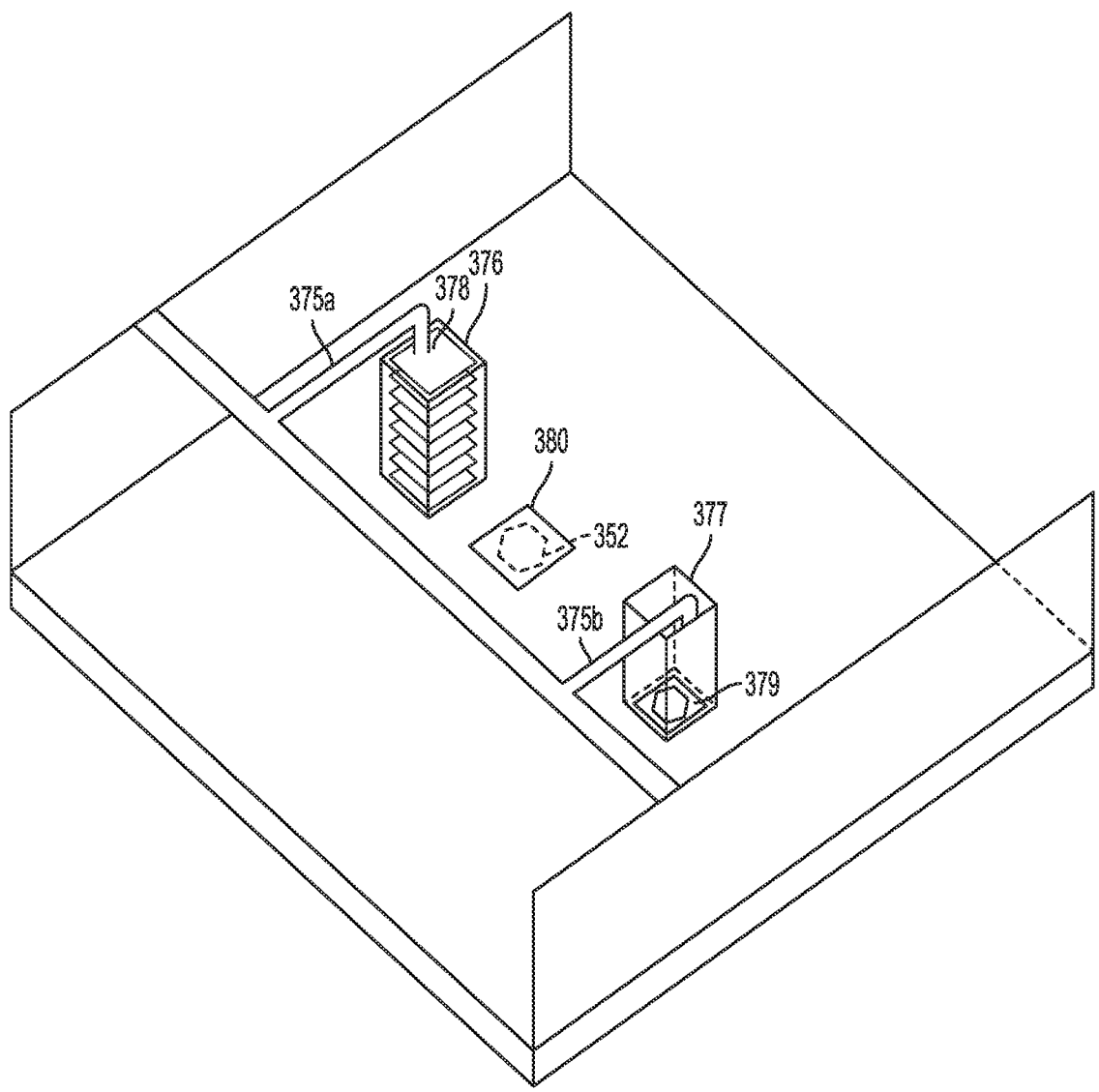
FIG. 3D shows a schematic diagram of the apparatus after fusing of the new layer to the object according to a second embodiment of the present disclosure.

FIGS. 3B-3D represent steps of a method of additive manufacturing according to a second embodiment of the present disclosure. In some aspects, the foil delivery unit 376*a* contains a sheet cartridge 376 and a discard bin 377 (FIGS. 3A-3B). Discard bin 377 may be top-loading, bottom-loading, or side-loading, and may be covered or uncovered. In other aspects, foil delivery unit 376*a* contains a sheet cartridge 376 and no discard bin. Sheet cartridge 376 supplies a fresh sheet of foil 378, which extends over a build plate face 344, upon which object 352 is built. The cartridge may be a sealed unit that protects the foil from external elements prior to insertion in apparatus 340. FIG. 3B shows a simplified overhead view of a schematic of the apparatus 340 before sheet cartridge 376 dispenses a sheet 378 of foil. In some aspects, sheet cartridge 376 stores multiple sheets 378 of foil. Sheet cartridges 376 may supply each sheet 378 of foil manually or automatically after cartridge insertion. After all of the materials from the cartridge 376 are expended, the cartridge 376 can be removed or deposited off, and a fresh cartridge can be inserted (manually) or picked up (automatically), allowing the build process to continue.

According to a second embodiment of the present disclosure, sheet cartridge 376 dispenses an active sheet 380 onto object 352 (not shown) or, in the case of building an initial layer of an object, onto build plate face 344 (FIG. 3C).

In some aspects, a laminar gas flow (not shown) is applied to the face of active sheet 380 not facing the object 352 or the build plate 344. Application of laminar gas flow may help minimize any distance between active sheet 380 and object 352, thusly enhancing contact between active foil 380 and object 352 or, when building the initial layer of the object, between active foil 380 and the build plate face 344. During operation, if a laminar gas flow is used, energy source 350 is a laser source and energy beam 370 is a laser beam. Laminar gas flow according to the second embodiment of the present disclosure may be similar in some aspects to laminar gas flow according to the first embodiment of the present disclosure.

Energy beam 370 is then used to cut active foil 380 (FIG. 3C) in order to produce a layer of object 352 (not shown). Cutting the active foil according to the second embodiment of the present disclosure may be similar in some aspects to cutting the active foil according to the first embodiment of the present disclosure. In some aspects, the layer may be the initial layer in the manufacture of object 352. In some aspects the layer may be the final layer in the manufacture of object 352. In some aspects, the layer may be an intermediate layer in the manufacture of object 352.

In some aspects, energy beam 370 first irradiates along a perimeter 354 of the layer 358 to be added in order to fuse the active sheet 380 to object 352 at perimeter 354 (FIG. 3C). In some aspects, the irradiation simultaneously cuts through active foil 380. In other aspects, energy beam 370 cuts active foil 380 along perimeter 354 prior to irradiation along perimeter 354 in order to fuse active foil 380 to object 352 at perimeter 354, and then energy beam 370 irradiates active sheet 380 along perimeter 354.

In some aspects, after cutting and irradiation (simultaneously or sequentially in either order) along perimeter 354, energy beam 370 irradiates area 356 in a raster-fill manner, to fuse active foil 380 to the object 352.

In other aspects, energy beam 370 first irradiates area 356 in a raster-fill manner, to fuse active foil 380 to the object 352, and then cuts and irradiates along perimeter 354 of the layer added. In such aspects, the cutting and irradiation along perimeter 354 may occur simultaneously or sequentially in either order.

Suitable settings for the energy beam 370, energy source 350, and/or the radiation emission directing device (illustrated as, e.g., galvo scanner 362) for cutting active foil 380 and for irradiating active foil 380 along either perimeter 354 or in area 356 are known or can be determined by those of ordinary skill in the art.

Completion of cutting and irradiation along perimeter 354 creates a hole 360, wherefrom a new layer was added to object 352, in remaining portion 379 (FIGS. 3C-3D). In some aspects, the laminar gas flow may be reduced or eliminated upon creation of hole 360 and/or raster-filling of area 356, to enhance separation of remaining portion 379 from object 352. Remaining portion 379 may then be moved into discard bin 377, either manually or automatically, such as by the dispensing of a new active sheet 380 on top of object 352 to build the next layer. In some aspects, the apparatus 340 does not include a discard bin 377 and may comprise a separate robotic arm for removing waste foil 379 from build plate face 344. In other aspects, the apparatus 340 includes a discard bin 377 and a separate robotic arm for moving waste foil 379 into discard bin 377.

In some aspects, no further layers are built. In some aspects, one or more further layers are built.

Figure 3E:
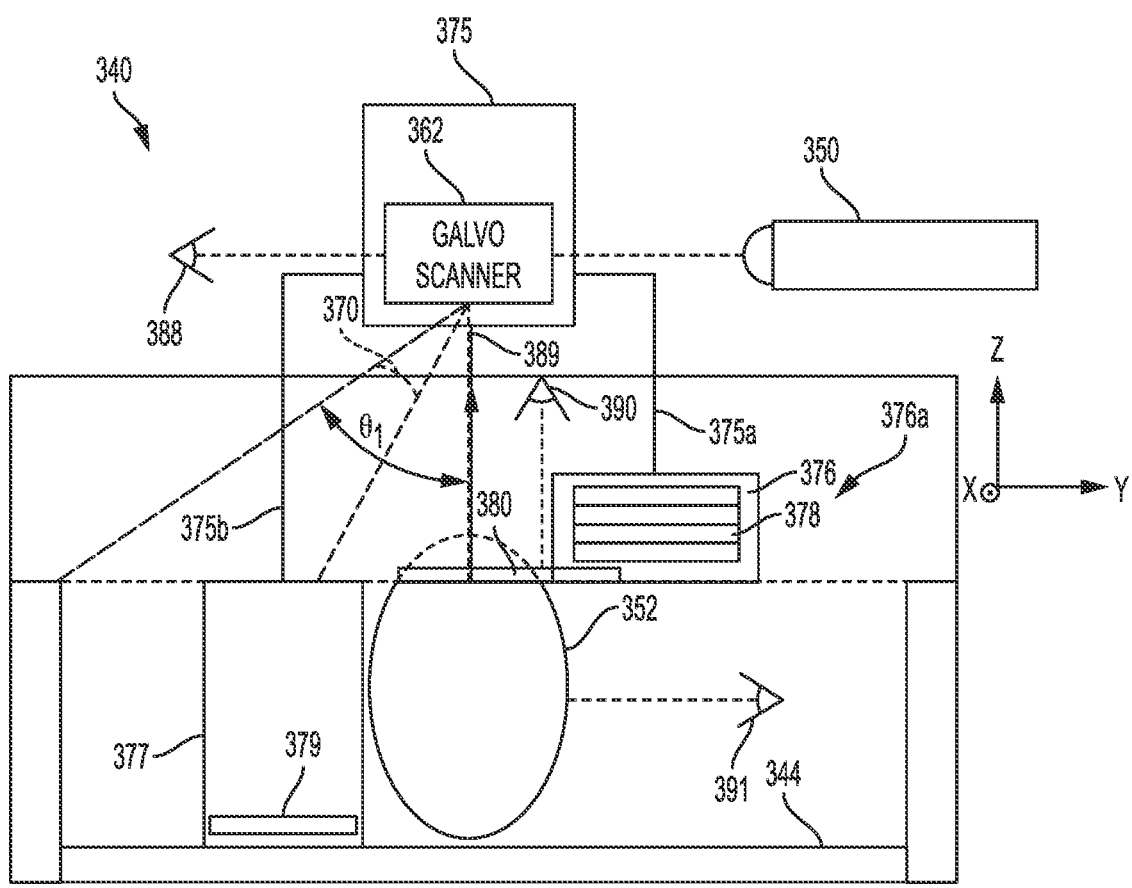
FIG. 3E shows a schematic diagram of an apparatus for AM with process monitoring according to a second embodiment of the present disclosure.

In some aspects, apparatus 240 may further comprise one or more detectors for process monitoring (FIG. 3E). The build process depicted in FIGS. 3B-3D reflects return radiation beam 389, which may be similar in some aspects to return radiation beam 289 and travels back to galvo scanner 362 and then to photodetector 388. Photodetector 388 may be similar in some aspects to photodetector 288. In addition, apparatus 340 may further comprise detectors 390, 391, which may be similar in some aspects to detectors 290, 291, respectively. Inspection by detector 390 of the foil may include inspection of one or more of sheet cartridge 376, discard bil 377, foil sheet 380, and remaining portion 279.

Foil Part Warp Compensation for Mobile Large Scale Additive Manufacturing Using Foil-Based Build Materials In an aspect, the disclosure includes methods and apparatuses for warp compensation during mobile large scale additive manufacturing using foil-based build materials. In conventional DMLM processes, heat applied to one side of a build plate may result in warping of the build plate or a workpiece built thereon. According to the present disclosure, additive manufacturing is carried out on opposite faces of a build plate, simultaneously, using foil-based build materials. Building on opposite faces of a build plate simultaneously may minimize warping of the build plate and/or the object or part being built by balancing heat distribution on both sides of the build plate. In addition, simultaneously building on opposite faces of a build plate doubles the build rate per plate, thereby expediting manufacturing processes.

FIGS. 4A-4D show schematic diagrams of an apparatus according to a third embodiment of the present disclosure.

Figure 4A:
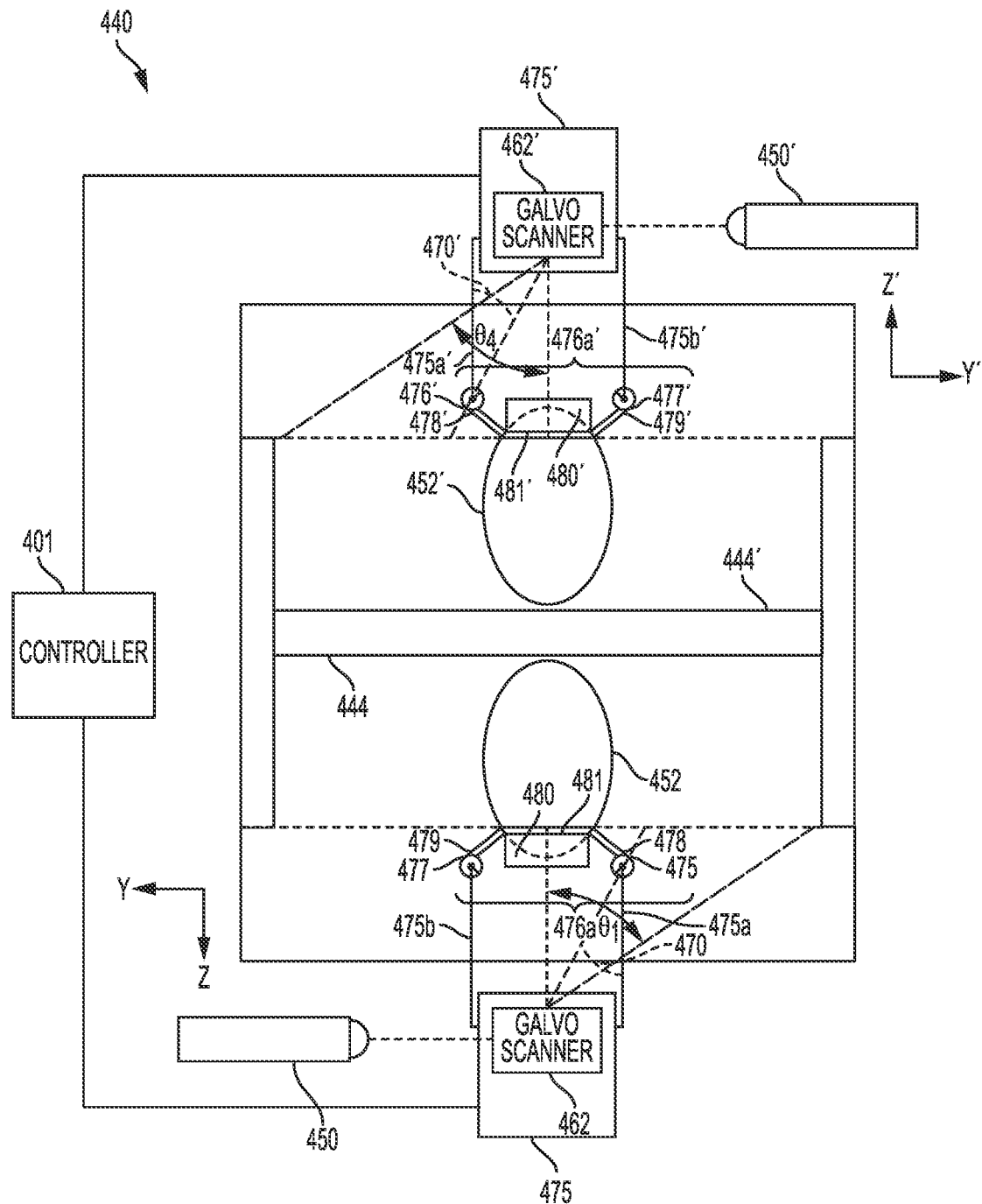
FIG. 4A shows a schematic diagram of an apparatus for AM according to a third embodiment of the present disclosure.

Apparatus 440 comprises a build plate with two faces 444, 444', both of which are available for building an object by additive manufacturing (FIG. 4A). In some aspects, the build plate lies in an xy-plane with respect to face 444 and in an x'y'-plane with respect to face 444', with building occurring in the z-direction relative to face 444 and in the z'-direction relative to face 444'. For simplicity, only building on face 444' will be discussed, but it is to be understood that the same aspects described for building on face 444' apply to building on face 444 with equal force.

As described above, additive manufacturing may be carried out simultaneously on both build plate faces 444, 444' of apparatus 440. The two faces 444, 444' are preferably symmetrical. Without wishing to be bound to any particular theory, it is believed that simultaneous, symmetrical additive manufacturing on faces 444, 444' balances the heat, weight, and other factors and/or forces on each face and thereby minimizes warping of the object and/or the build plate.

In some aspects, identical objects 452, 452' are constructed on faces 444, 444' respectively. In other aspects, objects 452, 452' are not identical. In some such aspects, objects 452, 452' are complementary or supplementary. In some aspects, the same build material is used on both faces 444, 444'. In other aspects, different build material are used to build on faces 444, 444'.

Building on faces 444, 444' may be controlled by a controller 401. In an aspect where identical objects 452, 452' are constructed, the controller 401 receives a single input for the object 452, for example, a computer-aided design (CAD) model of the object. The controller 401 generates a control signal based on the object, for example, by slicing the object to determine a scan pattern for each layer. The control signal is then sent to both sides of apparatus 440. Accordingly, the respective components (e.g., build units 475, 475') are concurrently controlled. At any point during the build process, the objects 452, 452' may substantially identical. Additionally, thermal properties and applied forces of the two sides of apparatus 440 may be similar. Therefore, the apparatus 400 may double the build speed of apparatus 240 and may potentially reduce warping due to thermal differentials and imbalanced forces.

A build unit 475' comprising positioning system 475a', 475b' for foil delivery unit 476a', comprising foil supply 476' and foil collector 477', is used to build an object 452' using foil 478'. In some aspects, positioning system 475a', 475b' allows movement of foil delivery unit 476a' in three dimensions. In some aspects, build unit 475' houses a radiation emission directing device, such as galvo scanner 462', which may be used to modulate energy beam 470' from energy source 450'. For example, the galvo scanner 462' may reflect or bend the energy beam 470' to scan different regions on the face 444' or an object thereon. In such aspects, by moving to a particular location with respect to face 444', build unit 475' may limit the angle $\theta_4'$ of energy beam 470' used to scan the face 444'. The limited angle may provide more consistent melting of the foil. In other aspects, galvo scanner 462' is not contained within build unit 475'.

In some aspects, energy source 450' is a laser source. In other aspects, energy source 450' is an electron beam source. In such aspects, the apparatus 440 is operated under vacuum conditions. In some such aspects, the radiation emission directing device is a deflecting coil. The laser energy source 450' may be a laser source under either vacuum or non-vacuum conditions.

In some aspects, build unit 475' is attached to a positioning system, such as a gantry, movable in at least three dimensions, which may be, e.g., x, y, and z coordinates, during operation, in order to position the radiation emission directing device (illustrated as, e.g., galvo scanner 462') and/or foil delivery unit 476a' relative to build plate face 444' and/or object 452'. In addition, build unit 475' is preferably rotatable in all directions, with roll, pitch, and yaw. As a result, build unit 475' is preferably able to operate upside down or at any angle.

In a third embodiment, foil delivery unit 476a' supplies a continuous roll of a build material in the form of a foil. Foil delivery unit 476a' may be similar in some aspects to foil delivery unit 276a.

Figure 4B:
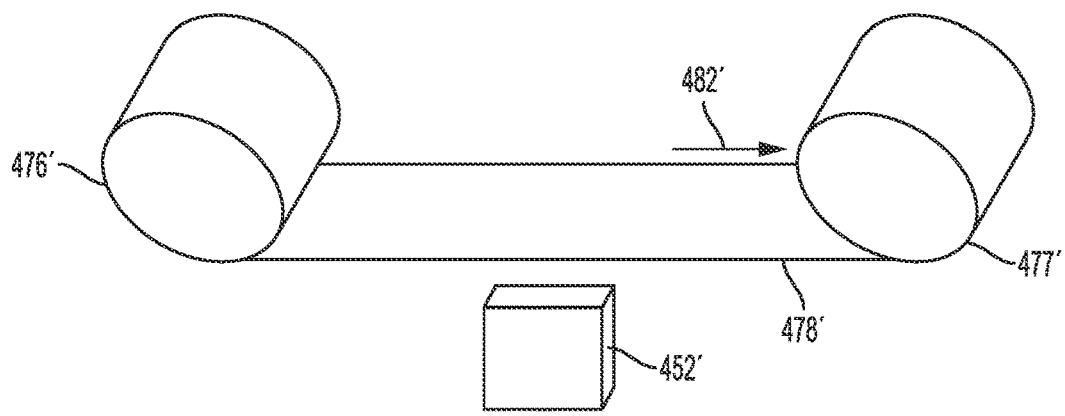
FIG. 4B shows a schematic diagram of supplying a length of fresh build material according to a third embodiment of the present disclosure.
Figure 4C:
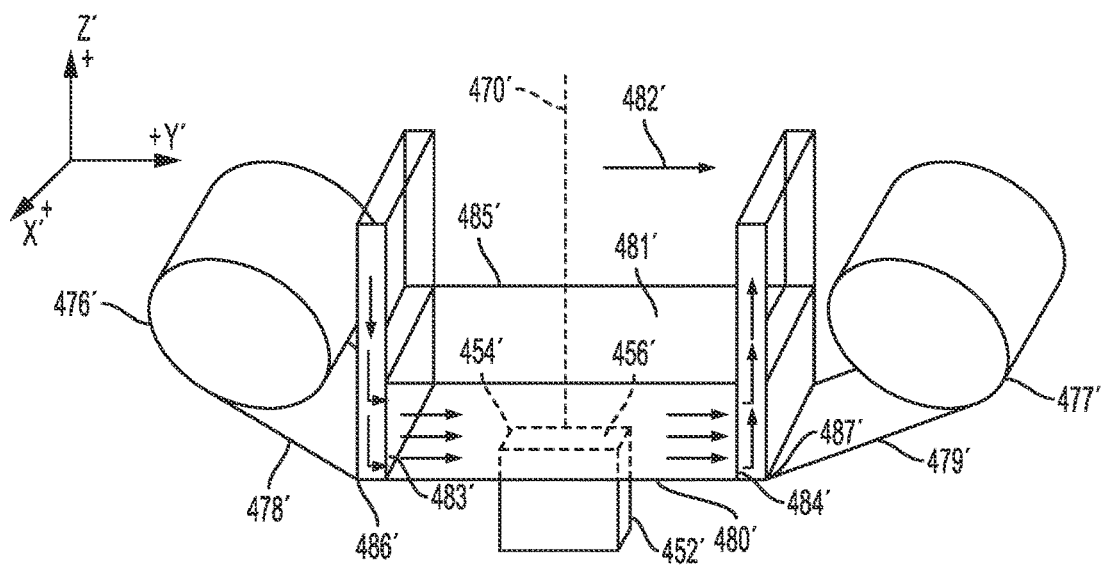
FIG. 4C shows a schematic diagram of cutting and irradiating a portion of build material in the preparation of a new layer according to a third embodiment of the present disclosure.
Figure 4D:
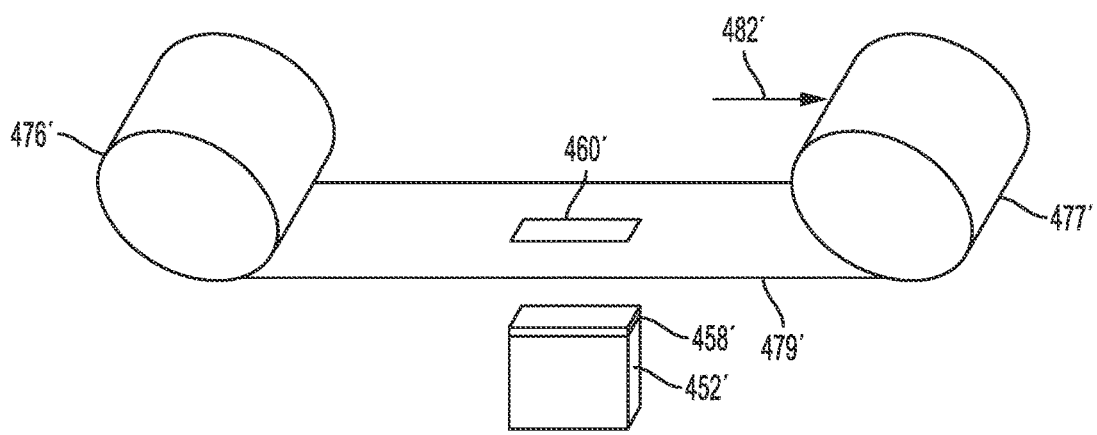
FIG. 4D shows a schematic diagram of the apparatus after fusing of the new layer to the object according to a third embodiment of the present disclosure.

FIGS. 4B-4D represent steps of a method of additive manufacturing according to a third embodiment of the present disclosure. In some aspects, the foil delivery unit 476a' contains a foil supply roll 476' and a collection roll 477'. Supply roll 476' supplies a length of fresh foil 478', which extends over a build plate face 444', upon which object 452' is built, in direction 482' towards collection roll 477' (FIGS. 4A-4B).

In some aspects, supply roll 476' is supplied as a cartridge to be installed in the foil delivery unit. The cartridge may be a sealed unit that protects the foil from external elements prior to insertion into the apparatus 440. In such aspects, the cartridge may supply foil manually or automatically after cartridge insertion. In such aspects, after all of the materials from the cartridge are expended, the cartridge can be removed or deposited off, and a fresh cartridge can be inserted (manually) or picked up (automatically), allowing the build process to continue.

In some aspects, a laminar gas flow 481' is applied to the build area (FIG. 4C). Laminar gas flow 481' may be similar in some aspects to laminar gas flow 281. Suitable gases for use in laminar gas flow 281 include, but are not limited to, nitrogen, argon, and/or helium, and combinations thereof. Laminar flow may be effected by any suitable means known to those of ordinary skill in the art, such as by using a gasflow device 485', e.g., as disclosed in U.S. patent application Ser. No. 15/406,454, filed Jan. 13, 2017, which is herein incorporated by reference in its entirety. Gasflow device 485' may be similar in some aspects to gasflow device 285. In some aspects, the gasflow device 485' may be adapted to provide a reduced oxygen environment. During operation, if a laminar gas flow is used, then the energy source 450' is a laser source and energy beam 470' is a laser beam.

In some aspects, the build unit comprises a gasflow device 485' adapted to provide a substantially laminar gas flow to a laminar gas flow zone 481' within two inches of, and substantially parallel to, a work surface, such as build plate face 444' or an object 452' thereon. The gasflow device 485' may be adapted to maintain a laminar gas flow zone 481', to provide a low oxygen environment around the work surface in a region below the build unit. There may also be a reduced oxygen zone above the laminar gas flow zone 481'. In some aspects, both gas zones may be contained within a containment zone surrounding at least the build unit and positioning system. In some aspects, the build unit may be at least partially enclosed to form a low oxygen environment above the build area of the work surface, i.e., around the path of beam 470'; an example of such an at least partially enclosed build unit is disclosed in U.S. patent application Ser. No. 15/406,454, which is herein incorporated by reference in its entirety.

In the embodiment illustrated in FIG. 4B, the laminar gas flow zone 481' is essentially the volume of gas flow device 485', i.e., the volume defined by the vertical (x'z') surfaces of pressurized inlet portion 483' and pressurized outlet portion 484' and by extending imaginary surfaces from the respective upper and lower edges of the inlet portion to the upper and lower edges of the outlet portion in the x'y' plane.

In some aspects, laminar gas flow 481' is applied substantially parallel to the face of the length of fresh foil 478' not facing the object 452' or the build plate face 444', giving rise to an active foil 480'. Positioning of gasflow device 485' and application of laminar gas flow 481' minimizes any distance between active foil 480' and object 452', thusly establishing contact between active foil 480' and object 452' or, when building the initial layer of the object, between active foil 480' and the build plate face 444'. When a laminar gas flow 481' is used, energy source 450' is a laser source and energy beam 470' is a laser beam. In some aspects, the apparatus 440 may further comprise rollers to help establish contact between active foil 480' and object 452' or, when building the initial layer of the object, between active foil 480' and build face 444'. The rollers may move in the z' direction with respect to the foil supply roll 476' to bring active foil 480' into contact with the object 452' or face 444', such as by forming bends 486', 487' in active foil 480', and to retract the active foil 480' therefrom.

Energy beam 470' is then used to cut active foil 480' (FIG. 4C) in order to produce an additional layer 458' (FIG. 4D). Cutting the active foil according to the third embodiment of the present disclosure may be similar in some aspects to cutting the active foil according to the first embodiment. In some aspects, layer 458' may be the initial layer in the manufacture of object 452'. In some aspects, layer 458' may be the final layer in the manufacture of object 452'. In some aspects, layer 458' may be an intermediate layer in the manufacture of object 452'.

In some aspects, energy beam 470' first irradiates along a perimeter 454' of the layer 458' to be added in order to fuse active foil 480' to object 452' at perimeter 454' (FIG. 4C). In some aspects, the irradiation simultaneously cuts through active foil 480'. In other aspects, energy beam 470' cuts active foil 480' along perimeter 454' prior to irradiation along perimeter 454' to fuse perimeter 454' to object 452'. In other aspects, energy beam 470' irradiates along perimeter 454' in order to fuse active foil 480' to object 452' at perimeter 454', and then energy beam 470' cuts active foil 480' along perimeter 454'.

In some aspects, after cutting and irradiation (simultaneously or sequentially in either order) along perimeter 454', energy beam 470' irradiates area 456' in a raster-fill manner, to fuse active foil 480' to the object 452'.

In other aspects, energy beam 470' first irradiates area 456' in a raster-fill manner, to fuse active foil 480' to the object 452', and then cuts and irradiates along perimeter 454' of the layer added. In such aspects, the cutting and irradiation along perimeter 454' may occur simultaneously or sequentially in either order.

Suitable settings for the energy beam 470', energy source 450', and/or the radiation emission directing device (illustrated as, e.g., galvo scanner 462') for cutting active foil 480' and for irradiating active foil 480' either along perimeter 454' or in area 456' are known or can be determined by those of ordinary skill in the art.

Completion of cutting and irradiation along perimeter 454' creates a hole 460', wherefrom new layer 458' was added to object 452', in remaining portion 479' (FIG. 4D). In some aspects, the laminar gas flow 481' may be reduced or eliminated upon creation of hole 460' and/or raster-filling of area 456', to enhance separation of remaining portion 479' from object 452'. Remaining portion 479' may then be advanced in direction 482' onto collection roll 477', to provide a fresh length of foil 478' to build the next layer. In some aspects, no further layers are built. In some aspects, one or more further layers are built.

Figure 4E:
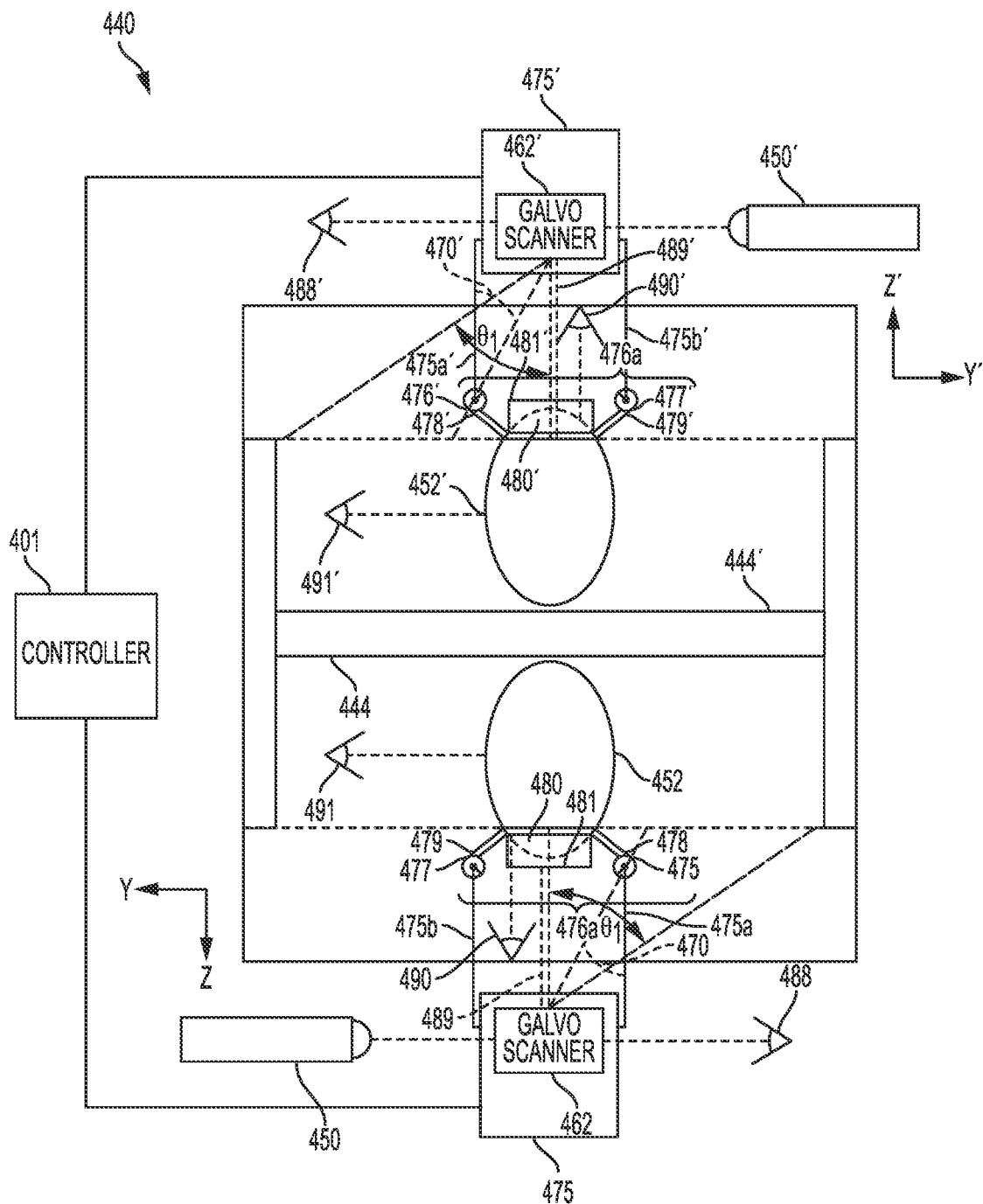
FIG. 4E shows a schematic diagram of an apparatus for AM with process monitoring according to a third embodiment of the present disclosure.

In some aspects, apparatus 440 may further comprise one or more detectors for process monitoring (FIG. 4E). The build process depicted in FIGS. 4B-4D reflects return radiation beam 489', which may be similar in some aspects to return radiation beam 289 and travels back to galvo scanner 462' and then to photodetector 488'. Photodetector 488' may be similar in some aspects to photodetector 288. In addition, apparatus 440 may further comprise detectors 490', 491', which may be similar in some aspects to detectors 290, 291, respectively. Inspection by detector 490' of the foil may include inspection of one or more of foil supply roll 476', foil collection roll 477', fresh foil 478', active foil 480', and remaining portion 479'. Detectors 491 and 491' may be located on opposite sides of the build plate 444 and may be positioned to observe the respective objects 452 and 452'. The detector 491 may be located in the z-direction less than a size of the object 452 in the z-direction. The detector 491' may be located in the z-direction less than a size of the object 452' in the z'-direction. As discussed above regarding the detector 291, the positioning of a detector under the current build layer may allow direct observation of completed portions of the object 452, 452'. As previously stated, it is to be understood that inspection by detector 490 will be analogous (i.e., may include inspection of one or more of foil supply roll 476, foil collection roll 477, etc.).

FIGS. 5A-D show schematic diagrams of an apparatus according to a fourth embodiment of the present disclosure.

Figure 5A:
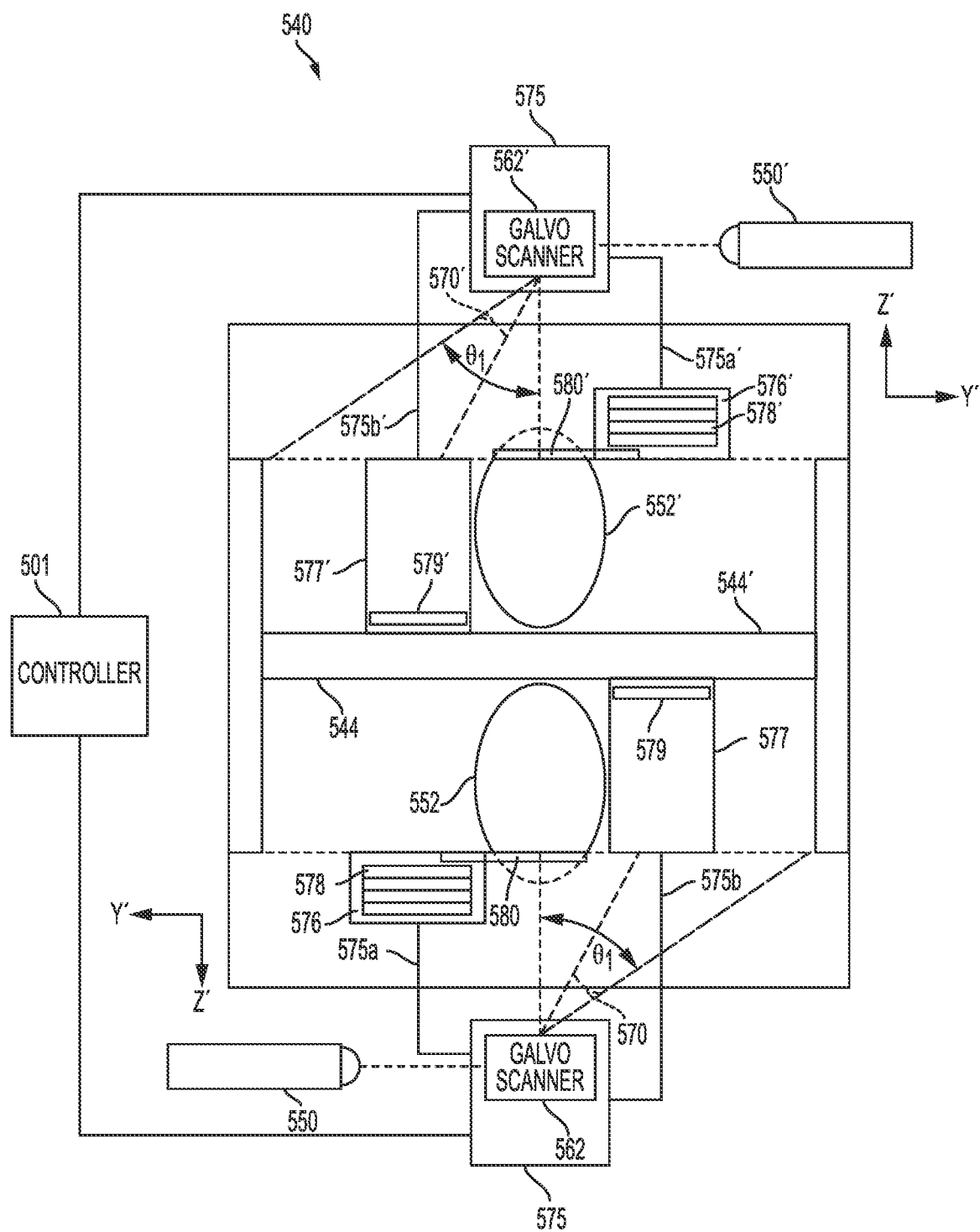
FIG. 5A shows a schematic diagram of an apparatus for AM according to a fourth embodiment of the present disclosure.

Apparatus 540 comprises a build plate with two faces 544, 544', both of which are available for building an object by additive manufacturing (FIG. 5A). In some aspects, the build plate lies in an xy-plane with respect to face 544 and in an x'y'-plane with respect to face 544', with building occurring in the z-direction relative to face 544 and in the z'-direction relative to face 544' For simplicity, only building on face 544' will be discussed, but it is to be understood that the same aspects described for building on face 544' apply to building on 544 with equal force. Apparatus 540 and faces 544, 544' are similar in some aspects to apparatus 440 and faces 444, 444'.

A build unit 575' comprising positioning system 575a', 575b' for foil delivery unit 576a', comprising foil supply 576' and foil collector 577', is used to build an object 552' using foil 578'. In some aspects, positioning system 575a', 575b' allows movement of foil delivery unit 576a' in three dimensions. Build unit 575' may be similar in some aspects to build unit 475'. In some aspects, build unit 575' houses a radiation emission directing device, such as galvo scanner 562', which may be used to modulate energy beam 570' from energy source 550'. Modulating energy beam 570' may be similar in some aspects to modulating energy beam 470'. For example, galvo scanner 562' may reflect or bend energy beam 570' from energy source 550' to scan different regions on the surface 544' or an object 552' thereon. In such aspects, by moving to a particular location with respect to face 544', build unit 575' may limit the angle $\theta_5'$ of energy beam 570' used to scan the surface 544' This limited angle may provide more consistent melting of the foil. In other aspects, galvo scanner 562' is not contained within build unit 575'.

In some aspects, energy source 550' is a laser source. In other aspects, energy source 550' is an electron beam source. In such aspects, the apparatus 540' is operated under vacuum conditions. In some such aspects, the radiation emission directing device is a deflecting coil. The energy source 550' may be a laser source under either vacuum or non-vacuum conditions.

In some aspects, build unit 575' is attached to a positioning system, such as a gantry, movable in two to three dimensions, which may be, e.g., x, y, and z coordinates, during operation, in order to position the radiation emission directing device (illustrated as, e.g., galvo scanner 562') and/or foil delivery unit 576a' relative to build plate face 544' and/or object 552'. In addition, build unit 575' is preferably rotatable in at least two dimensions, i.e., in the x'y'-plane, around the z'-axis.

In a fourth embodiment, foil delivery unit 576a' supplies pre-cut sheets of foil.

Figure 5B:
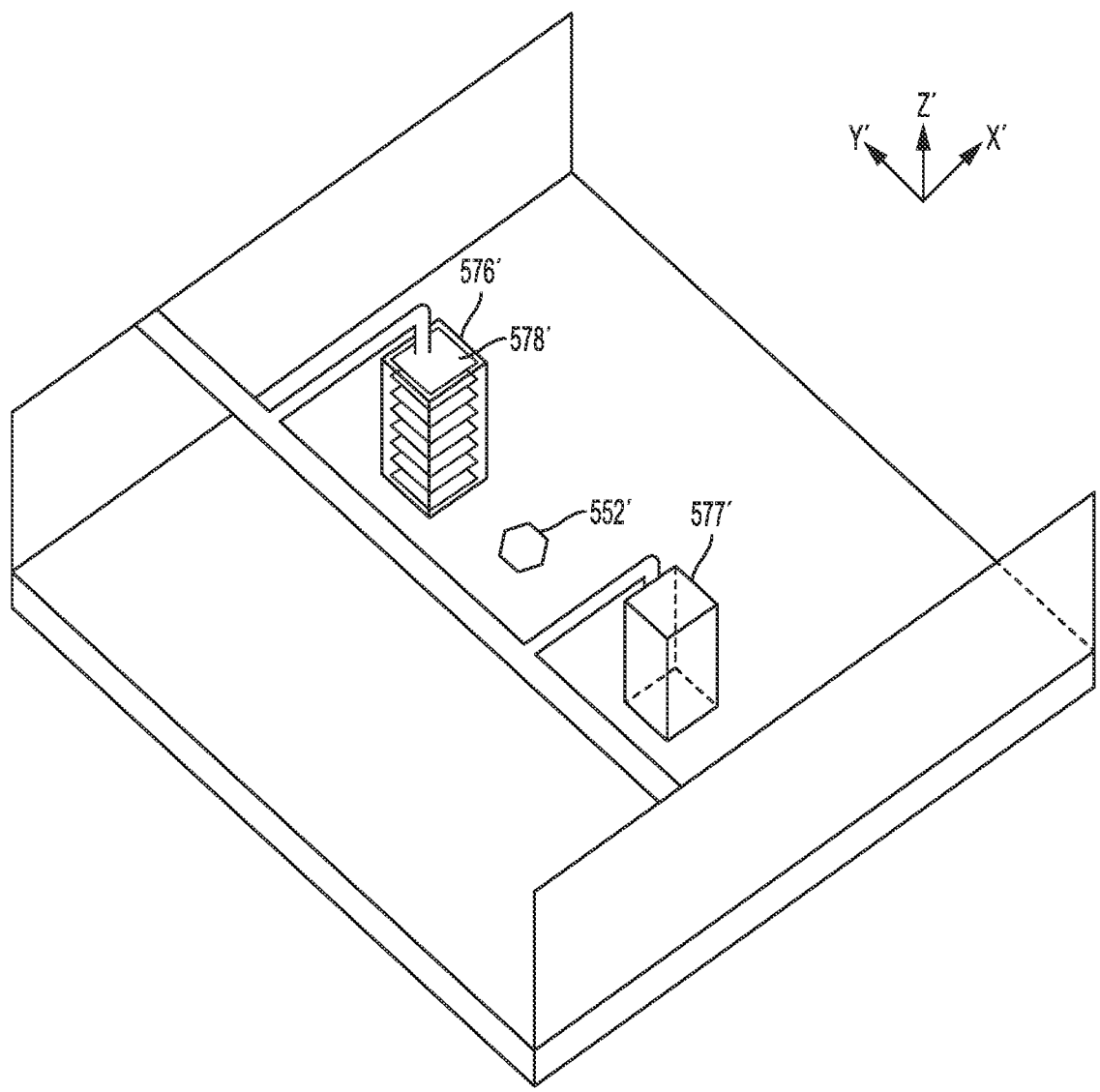
FIG. 5B shows a schematic diagram of supplying a sheet of fresh build material according to a fourth embodiment of the present disclosure.
Figure 5C:
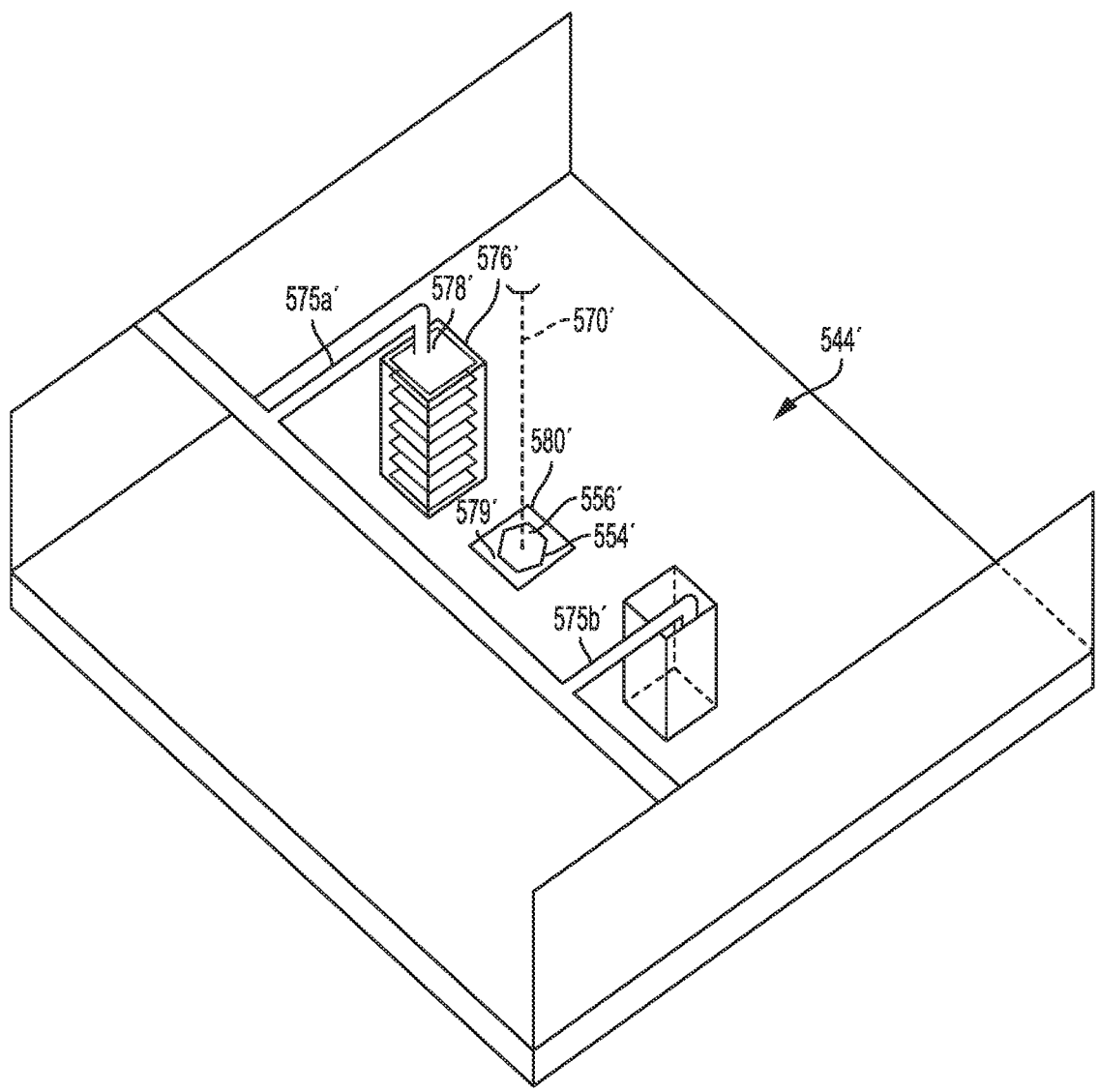
FIG. 5C shows a schematic diagram of cutting and irradiating a portion of build material in the preparation of a new layer according to a fourth embodiment of the present disclosure.
Figure 5D:
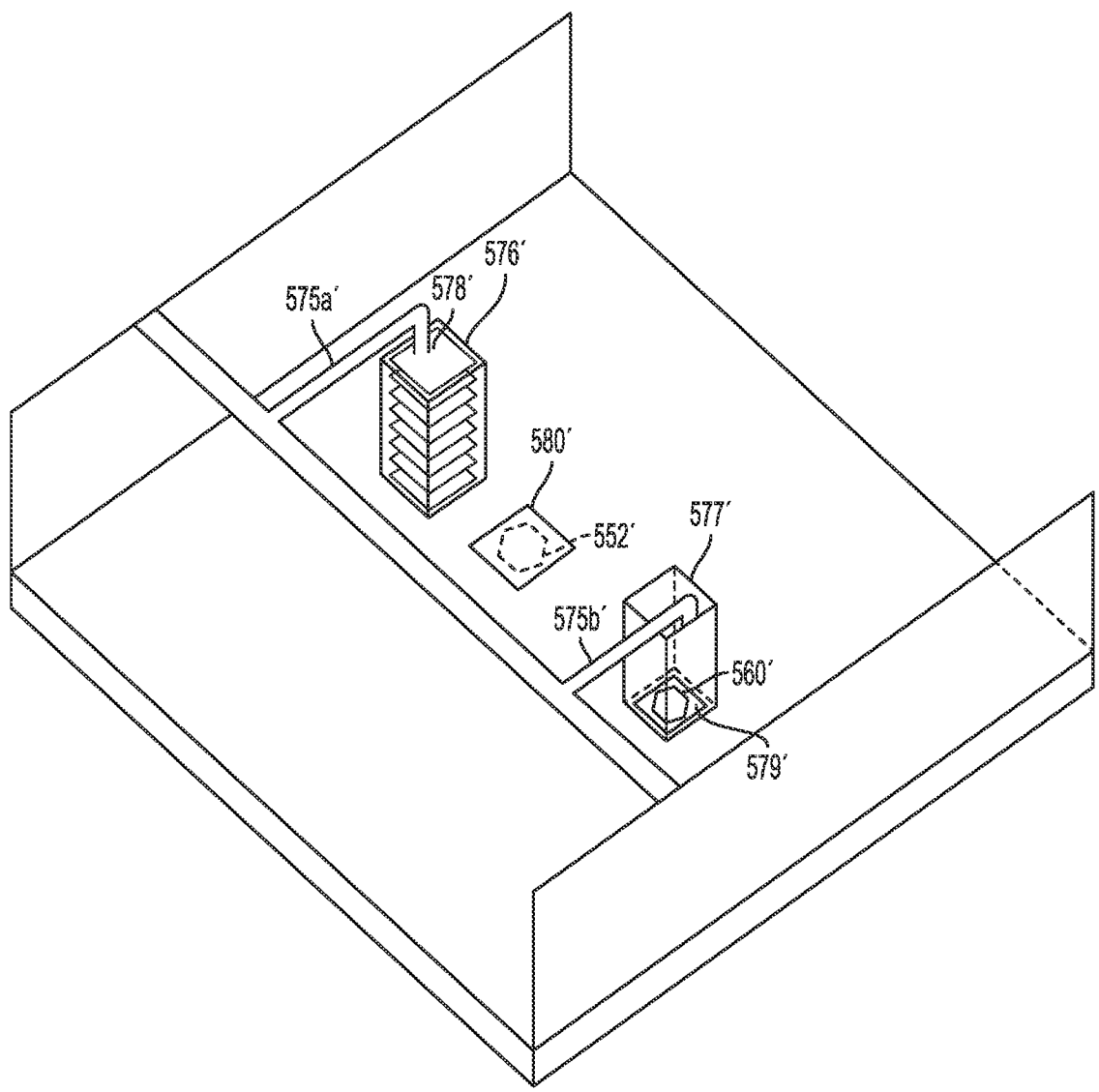
FIG. 5D shows a schematic diagram of the apparatus after fusing of the new layer to the object according to a fourth embodiment of the present disclosure.

FIGS. 5B-5D represent steps of a method of additive manufacturing according to a fourth embodiment of the present disclosure. In some aspects, the foil delivery unit 576a' contains a sheet cartridge 576' and a discard bin 577' (FIGS. 5A-5B). Sheet cartridge 576' and discard bin 577' may be similar in some aspects to sheet cartridge 376 and discard bin 377, respectively. Foil delivery unit 576a' may be similar in some aspects to foil delivery unit 376a. Discard bin 577' may be top-loading, bottom-loading, or side-loading, and may be covered or uncovered. In other aspects, foil delivery unit 576a' contains a sheet cartridge 576' and no discard bin. Sheet cartridge 576' supplies a fresh sheet of foil 578', which extends over a build plate face 544', upon which object 552' is built. FIG. 5B shows a simplified overhead view of a schematic of the apparatus 540 before sheet cartridge 576' dispenses a sheet 578' of foil. In some aspects, sheet cartridge 576' stores multiple sheets 578' of foil. Sheet cartridges 576' may supply each sheet 578' of foil manually or automatically after cartridge insertion. After all of the materials from the cartridge are expended, the cartridge 576' can be removed or deposited off, and a fresh cartridge can be inserted (manually) or picked up (automatically), allowing the build process to continue.

According to a fourth embodiment of the present disclosure, sheet cartridge 576' dispenses an active sheet 580' onto object 552' (not shown) or, in the case of building an initial layer of an object, onto build plate face 544' (FIG. 5C).

In some aspects, a laminar gas flow (not shown) is applied to the face of active sheet 580' not facing the object 552' or the build plate 544'. Application of laminar gas flow may help minimize any distance between active sheet 580' and object 552', thusly enhancing contact between active foil 580' and object 552' or, when building the initial layer of the object, between active foil 580' and the build plate face 544'. During operation, if a laminar gas flow is used, energy source 550' is a laser source and energy beam 570' is a laser beam. Laminar gas flow according to the fourth embodiment of the present disclosure may be similar in some aspects to laminar flow according to the first, second, and third embodiments.

Energy beam 570' is used to cut active foil 580' (FIG. 5C) in order to produce a layer of object 552' (not shown). Cutting the active foil according to the fourth embodiment may be similar in some aspects to cutting according to the first, second, and third embodiments. In some aspects, the layer may be the initial layer in the manufacture of object 552'. In some aspects the layer may be the final layer in the manufacture of object 552'. In some aspects, the layer may be an intermediate layer in the manufacture of object 552'.

In some aspects, energy beam 570' first irradiates along a perimeter 554' of the layer 558' to be added in order to fuse the active sheet 580' to object 552' at perimeter 554' (FIG. 5C). In some aspects, the irradiation simultaneously cuts through active foil 580'. In other aspects, energy beam 570' cuts active foil 580' along perimeter 554' prior to irradiation along 554' in order to fuse active foil 580' to object 552' at perimeter 554', and then energy beam 570' cuts active sheet 580' along perimeter 554'.

In some aspects, after cutting and irradiation (simultaneously or sequentially in either order) along perimeter 554', energy beam 570' irradiates area 556' in a raster-fill manner, to fuse active foil 580' to the object 552'.

In other aspects, energy beam 580' first irradiates area 556' in a raster-fill manner, to fuse active foil 580' to the object 552', and then cuts and irradiates along perimeter 554' of the layer added. In such aspects, the cutting and irradiation along perimeter 554' may occur simultaneously or sequentially in either order.

Suitable settings for the energy beam 570', energy source 550', and/or radiation emission directing device (illustrated as, e.g., galvo scanner 562') for cutting active foil 580' and for irradiating active foil 580' along either perimeter 554' or in area 556' are known or can be determined by those of ordinary skill in the art.

Completion of cutting and irradiation along perimeter 554' creates a hole 560', wherefrom a new layer was added to object 552', in remaining portion 579' (FIGS. 5C-5D). In some aspects, the laminar gas flow may be reduced or eliminated upon creation of hole 560' and/or raster-filling of area 556', to enhance separation of remaining portion 579' from object 552'. Remaining portion 579' may then be moved into discard bin 577', either manually or automatically, such as by the dispensing of a new active sheet 580' on top of object 552'. In some aspects, the apparatus 540 does not include a discard bin 577' and may comprise a separate robotic arm for removing remaining portion 579' from build plate face 544'. In other aspects, the apparatus 540 includes a discard bin 577' and a separate robotic arm for moving remaining portion 579' into discard bin 577'. In some aspects, no further layers are built. In some aspects, one or more further layers are built.

Figure 5E:
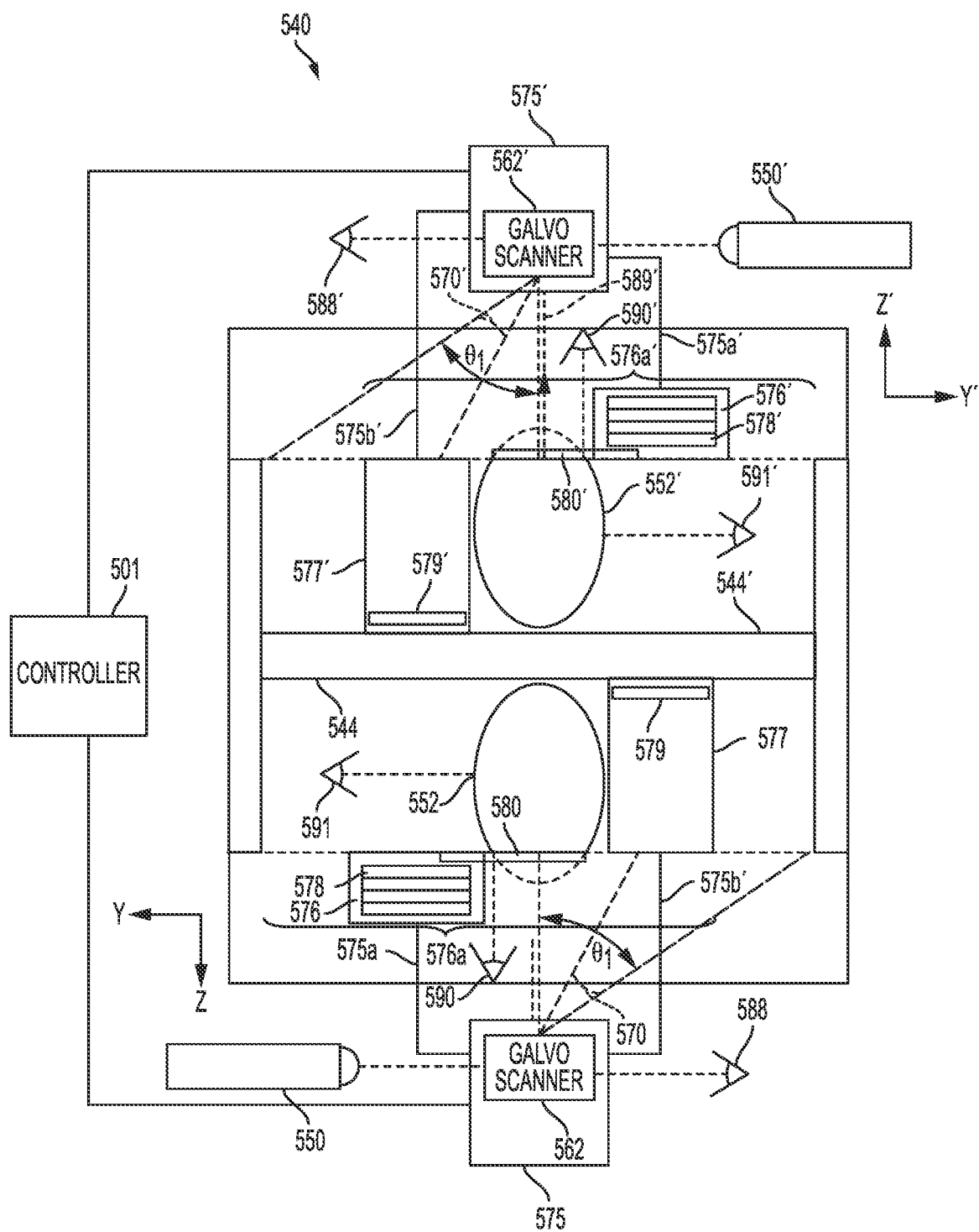
FIG. 5E shows a schematic diagram of an apparatus for AM with process monitoring according to a fourth embodiment of the present disclosure.

In some aspects, apparatus 540 may further comprise one or more detectors for process monitoring (FIG. 5E). The build process depicted in FIGS. 5B-5D reflects return radiation beam 589', which may be similar in some aspects to return radiation beam 389 and travels back to galvo scanner 562' and then to photodetector 588'. Photodetector 588' may be similar in some aspects to photodetector 388. In addition, apparatus 540 may further comprise detectors 590', 591', which may be similar in some aspects to detectors 390, 391, respectively. Inspection by detector 590' of the foil may include inspection of one or more of sheet cartridge 576', discard bin 577', foil sheet 578', and remaining portion 579'. As previously stated, it is to be understood that inspection by detector 590 will be analogous (i.e., may include inspection of one or more of sheet cartridge 576, discard bin 577, etc.).

Figure 6:
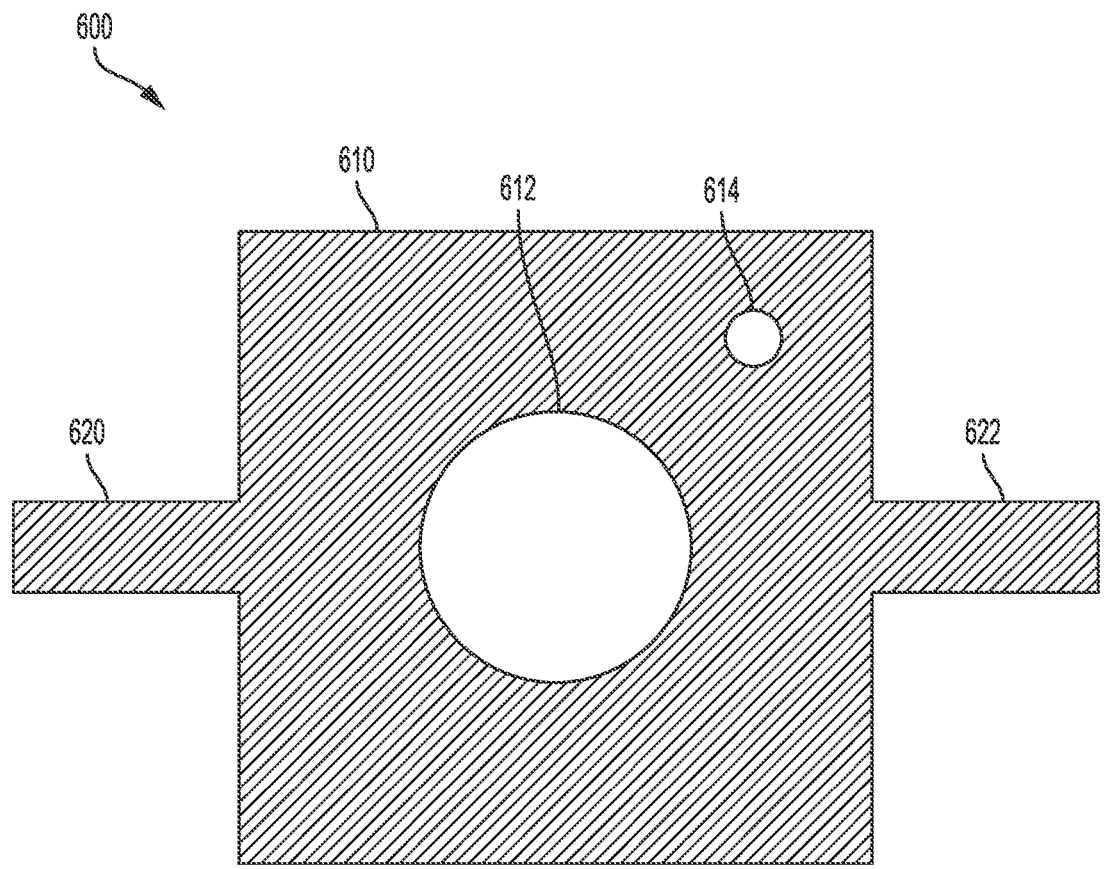
FIG. 6 shows a schematic diagram of an example layer to be added to an object using any of the apparatuses of the present disclosure.

FIG. 6 illustrates an example of a cross-sectional layer 600 of an object (e.g., object 252) in an xy-plane. A controller 401 may slice the object 252 into multiple such layers arranged in the z-dimension. Then the apparatus 240 builds the object 252 by scanning the layer x00 in the area 256 of the active foil 280 to fuse the area 256 to the build plate 244 of previously build portions of the object 252.

In the illustrated example, the layer 600 includes a main portion 610 and side portions 620, 622. The main portion 610 includes a relatively large opening 612 and a relatively small opening 614. In a foil-based apparatus such as the apparatus 240, an opening 612, 614 within a layer 600 may pose a problem. When the layer 600 is scanned, an area defined by the perimeter 254 is detached from the active foil 280, which becomes the remaining portion 279. When the entire area 256 is scanned, the detached area becomes part of the object 252. When the layer 600 includes an opening 612, 614, however, the foil within the opening becomes detached from both the remaining portion 279 and the rest of the layer 600. For some objects, the detached foil may be removed upon build completion. However, it is also possible that the detached foil corresponding to the opening 612 may move during a build operation and interfere with the build operation. Additionally, for objects that form an enclosed hollow volume, the detached foil may become trapped within the object. The present disclosure provides techniques to avoid creation of detached foil portions.

In an aspect, a relatively small opening (e.g., opening 614) may be formed by ablating the foil. For example, the power of the energy source 250 may be set to a level that causes the foil to disintegrate rather than fuse with an underlying object. In an aspect, the opening 614 may be formed when the active foil 280 is not in contact with the object 252 such that the ablation does not damage the object 252. In an aspect, the size of an opening created by ablation is limited depending on the build material, shape of the opening, and power of the energy source 250. Accordingly, ablation may be used when the size and shape of the opening 614 are less than threshold parameters.

Figure 7:
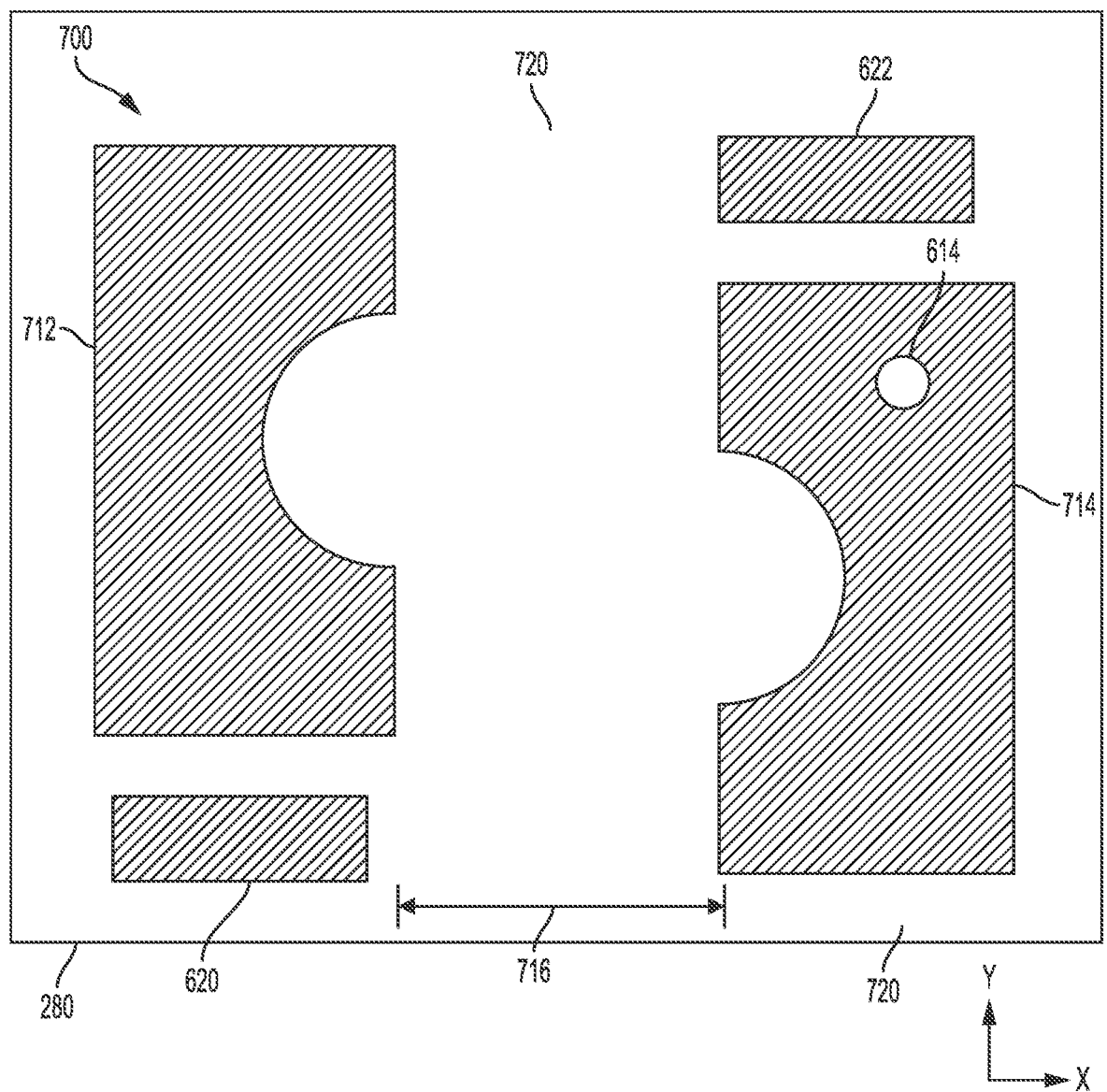
FIG. 7 shows a schematic diagram of the example layer of FIG. 7 rearranged according to an aspect of the present disclosure.

FIG. 7 is a diagram showing the layer 600 of FIG. 6 rearranged as the layer 700 without relatively large openings. The layer 700 can be scanned from the active foil 280 without creating detached foil corresponding to the opening 612. The main portion 610 is divided into a left portion 712 and a right portion 714 separated by a space 716. The space 716 connects to edge 720 of the active foil 280. The edges of the opening 612 are divided between the left portion 712 and right portion 714. Accordingly, the foil within the opening is also connected to the space 716. The side portion 620, 622 are also separated from left portion 712 and a right portion 714 to reduce the total length of foil for the layer. The relatively small opening 614 may remain within the right portion 714 and may be formed by ablation as discussed above.

When scanning the layer 700, the apparatus 240 moves the build unit 275 and/or the active foil 280 in one or more dimensions relative to the build plate 244 and/or object 252. For example, the apparatus 240 first scans the right portion 714 in a correct position relative to the build plate 244 to add the right portion 714 to the object 252. The right portion 714 may be cut from the active foil 280 by the scanning so that the active foil 280 may be moved relative to the right portion 714. For example, the apparatus 240 may move the active foil 280 in the z-dimension away from the right portion 714. The apparatus 240 then advances the active foil 280, or moves the build unit 275, in the x-dimension the distance y16 and also moves the build unit 275 in the y-dimension to bring the left portion 712 into alignment with the right portion 714. The build unit 275 may then move the active foil 280 in the z-dimension to restore contact between the active foil 280 and the object 252. The build unit 275 then scans the left portion 712 to fuse the left portion 712 to the object 252. The apparatus 240 may follow a similar sequence of positioning the build unit 275 and/or active foil 280 to align the side portions 620, 622 in their respective locations relative to the main portion 610 formed by scanning left portion 712 and right portion 714.

Accordingly, multiple portions of a layer are sequentially scanned to form a complete layer of the object. Separating a layer of the object into the multiple portions prevents openings within the layer from forming isolated detached foil sections. Additionally, separating the layer into multiple portions may be used to rearrange portions of the object on the foil to more efficiently utilize the area of the foil. Further, portions of sequential layers may overlap on the foil (e.g, in the y-dimension) to provide further efficient use of foil.

While the present disclosure describes aspects of the invention using a mobile build unit, various aspects may also be carried out using fixed bed foil-based materials. Aspects of additive manufacturing using fixed bed foil-based materials include those described in U.S. patent application Ser. No. 15/811,293, entitled "Fixed Bed Large Scale Additive Manufacturing Using Foil-Based Build Materials," filed on Nov. 13, 2017, the disclosure of which is incorporated herein by reference in its entirety.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims. Aspects from the various embodiments described, as well as other known equivalents for each such aspect, can be mixed and matched by one of ordinary skill in the art to construct additional embodiments and techniques in accordance with principles of this application.

The invention claimed is:

1. An apparatus for additive manufacturing of an object, the apparatus comprising:
    a build plate having a build face;
    a build unit facing the build face, the build unit comprising:
        a foil delivery unit, and
        a radiation emission directing device,
            wherein the build unit is configured to move foil from the foil delivery unit into contact with the build plate, or an object thereon, for incorporation into the object by irradiation;
        a positioning system coupled to the build unit, wherein the positioning system is movable to position the build unit vertically with respect to the build face; and
        one or more detectors configured to inspect one or more of the foil, the object, and radiation emitted or received by the radiation emission directing device.

2. The apparatus of claim 1, further comprising a controller configured to receive data from the one or more detectors and adjust one or more of radiation emitted by an energy source and/or the radiation emission directing device, the foil delivery unit, the build unit, or the one or more detectors based on the received data.

3. The apparatus of claim 1, wherein the one or more detectors is located between the build plate and the foil delivery unit and is configured to inspect the object.

4. The apparatus of claim 1, wherein the one or more detectors comprises a thermal scanner configured to inspect the object and generate a thermal profile of the object.

5. The apparatus of claim 1, wherein the one or more detectors comprises an electromagnetic detector configured to apply an electric current to the object and measure a magnetic property of eddy currents generated within the object.

6. The apparatus of claim 1, wherein the one or more detectors comprises a computerized tomography scanner.

7. The apparatus of claim 1, wherein the one or more detectors are configured to inspect before completion of the object.

8. The apparatus of claim 1, further comprising a foil collection device configured to receive a remaining portion of the foil after irradiation, wherein the one or more detectors configured to inspect the remaining portion.

9. An apparatus for additive manufacturing of an object, the apparatus comprising:
    a build plate having a build face;
    a build unit facing the build face, the build unit comprising:
        a foil delivery unit, and
        a radiation emission directing device,
    wherein the build unit is configured to move foil from the foil delivery unit into contact with the build plate, or an object thereon for incorporation into the object by radiation provided via the radiation emission directing device;
    one or more detectors configured to inspect one or more of the foil, the object, and radiation emitted or received by the radiation emission directing device; and
    a controller configured to receive data from the one or more detectors and adjust one or more of radiation emitted by an energy source and/or the radiation emission directing device, the foil delivery unit, the build unit, or the one or more detectors based on the received data.

10. An apparatus for additive manufacturing of an object, the apparatus comprising:
    a build plate having a build face;
    a build unit facing the build face, the build unit comprising:
        a foil delivery unit, and
        a radiation emission directing device,
    wherein the build unit is configured to move foil from the foil delivery unit into contact with the build plate, or an object thereon, for incorporation into the object by radiation provided via the radiation emission directing device;
    one or more detectors configured to inspect one or more of the foil, the object, and radiation emitted or received by the radiation emission directing device; and
    a foil collection device configured to receive a remaining portion of the foil after irradiation, wherein the one or more detectors is configured to inspect the remaining portion.

* * * * *